US012155065B2

(12) United States Patent
Kurita et al.

(10) Patent No.: US 12,155,065 B2
(45) Date of Patent: *Nov. 26, 2024

(54) NEGATIVE ELECTRODE MATERIAL FOR LITHIUM-ION SECONDARY BATTERY AND USE THEREOF

(71) Applicant: Group14 Technologies, Inc., Woodinville, WA (US)

(72) Inventors: Takayuki Kurita, Tokyo (JP); Yuji Ito, Tokyo (JP); Hirofumi Inoue, Tokyo (JP)

(73) Assignee: Group14 Technologies, Inc., Woodinville, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/927,591

(22) PCT Filed: May 28, 2021

(86) PCT No.: PCT/JP2021/020497
§ 371 (c)(1),
(2) Date: Nov. 23, 2022

(87) PCT Pub. No.: WO2021/241748
PCT Pub. Date: Dec. 2, 2021

(65) Prior Publication Data
US 2023/0207780 A1    Jun. 29, 2023

(30) Foreign Application Priority Data

May 28, 2020 (JP) ................................ 2020-093159
Jan. 15, 2021 (JP) ................................ 2021-005094
Jan. 15, 2021 (JP) ................................ 2021-005095

(51) Int. Cl.
*H01M 4/36* (2006.01)
*C01B 32/318* (2017.01)
(Continued)

(52) U.S. Cl.
CPC .......... *H01M 4/364* (2013.01); *C01B 32/318* (2017.08); *C01B 32/336* (2017.08);
(Continued)

(58) Field of Classification Search
CPC ...... H01M 4/362; H01M 4/366; H01M 4/625; H01M 4/386; H01M 4/0421; H01M 4/134;
(Continued)

(56) References Cited

U.S. PATENT DOCUMENTS 6,631,073 B1   10/2003  Sakata et al.
10,424,786 B1   9/2019  Mason et al.
(Continued)

FOREIGN PATENT DOCUMENTS

CN      102214823 A      10/2011
CN      108475779 A      8/2018
(Continued)

*Primary Examiner* — James M Erwin
*Assistant Examiner* — John S Medley
(74) *Attorney, Agent, or Firm* — Seed IP Law Group LLP (57) ABSTRACT

A negative electrode material for a lithium-ion secondary battery containing a composite (C) that contains a porous carbon (A) and a Si-containing compound (B). The porous carbon (A) satisfies $V_1/V_0 > 0.80$ and $V_2/V_0 < 0.10$. When a total pore volume at the maximum value of a relative pressure $P/P_0$ is defined as $V_0$ and $P_0$ is a saturated vapor pressure, a cumulative pore volume at a relative pressure $P/P_0 = 0.1$ is defined as $V_1$, and a cumulative pore volume at a relative pressure $P/P_0 = 10^{-7}$ is defined as $V_2$ in a nitrogen adsorption test. Further, the porous carbon (A) has a BET specific surface area of 800 m²/g or more, and the Si-containing compound (B) is contained in pores of the porous carbon (A). Also disclosed is a negative electrode sheet including the negative electrode material and a lithium-ion secondary battery including the negative electrode sheet.

13 Claims, 3 Drawing Sheets

(51) Int. Cl.
*C01B 32/336* (2017.01)
*H01M 4/04* (2006.01)
*H01M 4/133* (2010.01)
*H01M 4/38* (2006.01)
*H01M 4/583* (2010.01)
*H01M 4/587* (2010.01)
*H01M 4/62* (2006.01)
*H01M 10/0525* (2010.01)
*H01M 4/02* (2006.01)

(52) U.S. Cl.
CPC ......... *H01M 4/0404* (2013.01); *H01M 4/133* (2013.01); *H01M 4/366* (2013.01); *H01M 4/386* (2013.01); *H01M 4/583* (2013.01); *H01M 4/587* (2013.01); *H01M 4/622* (2013.01); *H01M 4/625* (2013.01); *H01M 10/0525* (2013.01); *C01P 2002/74* (2013.01); *C01P 2002/82* (2013.01); *C01P 2004/03* (2013.01); *C01P 2004/32* (2013.01); *C01P 2004/54* (2013.01); *C01P 2004/61* (2013.01); *C01P 2004/80* (2013.01); *C01P 2006/12* (2013.01); *C01P 2006/16* (2013.01); *C01P 2006/40* (2013.01); *H01M 2004/021* (2013.01); *H01M 2004/027* (2013.01)

(58) Field of Classification Search
CPC .. H01M 4/133; H01M 4/364; H01M 10/0525; H01M 4/583; H01M 4/587; C01B 32/336; C01B 32/318
USPC ............................ 429/231, 235, 252, 231.95
See application file for complete search history.

(56) References Cited

U.S. PATENT DOCUMENTS

2013/0004841 A1\* 1/2013 Thompkins ........... H01M 4/583
　　　　　　　　　　　　　　　　　　　　　429/204
2013/0130115 A1\* 5/2013 Park ..................... H01M 4/133
　　　　　　　　　　　　　　　　　　　　　977/890
2017/0152340 A1\* 6/2017 Geramita .............. H01M 4/587
2019/0267622 A1 8/2019 Sakshaug et al.
2019/0355971 A1 11/2019 Kim
2020/0152973 A1\* 5/2020 Mason .................. H01M 4/134

FOREIGN PATENT DOCUMENTS

| | | |
|---|---|---|
| CN | 108565437 A | 9/2018 |
| GB | 2584615 A | 12/2020 |
| JP | 11-339796 A | 12/1999 |
| JP | 2007-8790 A | 1/2007 |
| JP | 2007-39289 A | 2/2007 |
| JP | 3897709 B2 | 3/2007 |
| JP | 2009-49236 A | 3/2009 |
| JP | 2010-95390 A | 4/2010 |
| JP | 2010-525549 A | 7/2010 |
| JP | 2012-119079 A | 6/2012 |
| JP | 2014-511322 A | 5/2014 |
| JP | 2014-523468 A | 9/2014 |
| JP | 2015-50050 A | 3/2015 |
| JP | 2015-130287 A | 7/2015 |
| JP | 2016-132608 A | 7/2016 |
| JP | 2016-166116 A | 9/2016 |
| JP | 2017-88443 A | 5/2017 |
| JP | 2017-222547 A | 12/2017 |
| JP | 2018-32588 A | 3/2018 |
| JP | 6328107 B2 | 5/2018 |
| JP | 2018-534720 A | 11/2018 |
| JP | 2019-145212 A | 8/2019 |
| JP | 2019-179679 A | 10/2019 |
| KR | 10-2018-0113187 A | 10/2018 |
| KR | 10-2019-0122805 A | 10/2019 |
| WO | 2008/081883 A1 | 7/2008 |
| WO | 2015/019994 A1 | 2/2015 |
| WO | 2018/163778 A1 | 9/2018 |
| WO | 2019/031597 A1 | 2/2019 |
| WO | 2019/131861 A1 | 7/2019 |
| WO | 2019/131862 A1 | 7/2019 |
| WO | 2020/095067 A1 | 5/2020 |

\* cited by examiner

NEGATIVE ELECTRODE MATERIAL FOR LITHIUM-ION SECONDARY BATTERY AND USE THEREOF

CROSS REFERENCE TO RELATED APPLICATIONS

This application is a National Stage of International Application No. PCT/JP2021/020497 filed May 28, 2021, claiming priority based on Japanese Patent Application No. 2020-093159 filed May 28, 2020, Japanese Patent Application No. 2021-005094 filed Jan. 15, 2021, and Japanese Patent Application No. 2021-005095 filed Jan. 15, 2021.

TECHNICAL FIELD

The present invention relates to a novel negative electrode material for a lithium-ion secondary battery, a negative electrode sheet comprising the electrode material for a lithium-ion secondary battery, and a lithium-ion secondary battery.

BACKGROUND ART

Lithium-ion secondary batteries used in IT devices such as smartphones and tablet PCs, vacuum cleaners, electric tools, electric bicycles, drones, and automobiles require negative electrode active materials with high capacity and high output. Silicon (theoretical specific capacity: 4200 mAh/g), which has a higher theoretical specific capacity than currently used graphite (theoretical specific capacity: 372 mAh/g), has attracted attention as a negative electrode active material.

However, silicon (Si) expands and contracts in volume up to about 3 to 4 times in association with electrochemical insertion and deinsertion of lithium. As a result, the Si particles collapse or are separated from the electrode, and thus it is known that the lithium-ion secondary battery using Si has extremely low cycle characteristics. For this reason, instead of simply replacing graphite with Si, it is now being actively studied to use a structure in which the degree of expansion and contraction of the negative electrode material as a whole is reduced. Among them, many attempts have been made to form a composite with carbonaceous materials.

As such a negative electrode material for a lithium-ion secondary battery, U.S. Pat. No. 10,424,786B (Patent Literature 1) discloses a particulate material comprising a plurality of composite particles, wherein the composite particles comprise:
(a) a porous carbon framework comprising micropores and mesopores, wherein
  (i) the micropores and mesopores have a total pore volume as measured by gas adsorption of $P_1$ cm$^3$/g and $P_1$ has a value of at least 0.6 and no more than 2;
  (ii) the volume fraction of micropores ($\Phi m_a$) is in the range from 0.5 to 0.9, based on the total volume of micropores and mesopores;
  (iii) the volume fraction of pores having a pore diameter less than 10 nm ($\Phi_{10}$) is at least 0.75, based on the total volume of micropores and mesopores, and
  (iv) the porous carbon framework has a $D_{50}$ particle size of less than 20 µm;
(b) a plurality of nanoscale elemental silicon domains located within the micropores and/or mesopores of the porous carbon framework;

wherein the weight ratio of silicon to the porous carbon framework in the composite particles is in the range from [1×$P_1$ to 1.9×$P_1$]:1.

Further, JP2018-534720A (Patent Literature 2) discloses a composite comprising a porous carbon scaffold and silicon, wherein the composite comprises from 15 to 85% silicon by weight and a nitrogen-inaccessible volume ranging from 0.05 to 0.5 cm$^3$/g, and wherein the composite comprises a plurality of particles having a particle skeletal density ranging from 1.5 to 2.2 g/cm$^3$, as measured by helium pycnometry. Patent Literature 2 further discloses a porous carbon scaffold having a pore structure comprising 40 to 60% micropores, 40 to 60% mesopores, less than 1% macropores and a total pore volume between 0.1 and 0.5 cm$^3$/g as well as a composite in which the silicon content ranges from 25% to 65%.

CITATION LIST

Patent Literature

Patent Literature 1: U.S. Pat. No. 10,424,786B
Patent Literature 2: JP2018-534720A

SUMMARY OF INVENTION

Technical Problem

Since the porous carbon disclosed in Patent Literatures 1 and 2 contains mesopores, lumps of Si are likely to occur in the mesopores. The lump of Si is severely deteriorated as a negative electrode material of a lithium-ion secondary battery. Further, the porous carbon disclosed in Patent Literature 1 contains pores having a very small pore size among the micropores. Since Si cannot enter such pores, a high-capacity negative electrode material cannot be obtained.

As described above, when the porous carbon has many mesopores or very small pores, there is a problem that a high capacity cannot be obtained, and it is an object of the present invention to provide a novel negative electrode material for a lithium-ion secondary battery capable of solving the problem.

Solution to Problem

As a result of intensive studies in order to solve the above problems, the present inventors have found that the above problems can be sufficiently solved by satisfying predetermined requirements, and have thus completed the present invention.

The configuration of the present invention is as follows:
[1] A negative electrode material for a lithium-ion secondary battery comprising a composite (C), the composite (C) comprising a porous carbon (A) and a Si-containing compound (B), wherein the porous carbon (A) and the Si-containing compound (B) are as follows: wherein the porous carbon (A) satisfies $V_1/V_0 > 0.80$ and $V_2/V_0 < 0.10$,
  when a total pore volume at the maximum value of a relative pressure $P/P_0$ is defined as $V_0$ and $P_0$ is a saturated vapor pressure,
  a cumulative pore volume at a relative pressure $P/P_0 = 0.1$ is defined as $V_1$, and
  a cumulative pore volume at a relative pressure $P/P_0 = 10^{-7}$ is defined as $V_2$ in a nitrogen adsorption test,
  and has a BET specific surface area of 800 m$^2$/g or more; and wherein the Si-containing compound (B) is contained in pores of the porous carbon (A).

[2] The negative electrode material for a lithium-ion secondary battery according to [1], wherein the porous carbon (A) satisfies $V_3/V_0>0.50$, when a cumulative pore volume at a relative pressure $P/P_0=10^{-2}$ is defined as $V_3$ in the nitrogen adsorption test.

[3] The negative electrode material for a lithium-ion secondary battery according to [1] or [2], wherein the porous carbon (A) has the total pore volume $V_0$ in the nitrogen adsorption test of 0.4 cm$^3$/g or more and less than 1.0 cm$^3$/g.

[4] The negative electrode material for a lithium-ion secondary battery according to any one of [1] to [3], wherein the composite (C) has a 50% particle size ($D_{V50}$) of 2.0 μm or more and 30.0 μm or less, has a 10% particle size ($D_{V10}$) of 1.0 μm or more in a volume-based cumulative particle size distribution by laser diffraction method, and has a BET specific surface area of 0.5 m$^2$/g or more and 40.0 m$^2$/g or less.

[5] The negative electrode material for a lithium-ion secondary battery according to any one of [1] to [4], wherein the composite (C) has an average aspect ratio of 1.00 or more and 2.50 or less.

[6] The negative electrode material for a lithium-ion secondary battery according to any one of [1] to [5], wherein the Si-containing compound (B) is one or more selected from silicon elemental substance, silicon oxide, and silicon carbide.

[7] The negative electrode material for a lithium-ion secondary battery according to any one of [1] to [6], wherein a Si content in the composite (C) is 15% by mass or more and 85% by mass or less.

[8] The negative electrode material for a lithium-ion secondary battery according to any one of [1] to [7], wherein the Si content in the composite (C) is 15% or more and 95% or less with respect to a theoretical value, when a true density of Si is set to 2.32 g/cm$^3$ with respect to the total pore volume $V_0$ of the porous carbon (A), the theoretical value of the Si content (theoretical Si content) when total pores of the porous carbon (A) are occupied by Si is determined from:

theoretical Si content (%)=($V_0$ [cm$^3$/g]×1 [g]×2.32 [g/cm$^3$])/(($V_0$ [cm$^3$/g]×1[g]×2.32 [g/cm$^3$])+1 [g])×100.

[9] The negative electrode material for a lithium-ion secondary battery according to any one of [1] to [8], wherein ($I_{Si}/I_G$) is less than 0.30 with respect to a peak intensity ($I_{Si}$) in the vicinity of 470 cm$^{-1}$ and a peak intensity ($I_G$) in the vicinity of 1580 cm$^{-1}$ measured by Raman spectroscopy of the composite (C).

[10] The negative electrode material for a lithium-ion secondary battery according to any one of [1] to [9], wherein ($I_D/I_G$) is 0.50 or more and less than 1.50 with respect to a peak intensity ($I_G$) in the vicinity of 1580 cm$^{-1}$ and a peak intensity ($I_D$) in the vicinity of 1350 cm$^{-1}$ measured by Raman spectroscopy of the composite (C).

[11] The negative electrode material for a lithium-ion secondary battery according to any one of [1] to [10], wherein in an XRD pattern using a Cu—Kα ray of the composite (C), a full width at half maximum of a peak of a 111 plane of Si is 3.00° or more.

[12] The negative electrode material for a lithium-ion secondary battery according to any one of claims 1 to 11, further comprising polymer-coated composite particles, wherein the polymer-coated composite particles comprise inorganic particles and a polymer on a portion or the entire surface of the composite (C), wherein the inorganic particles comprise one or more selected from graphite and carbon black, and a content of the polymer is 0.1 to 10.0% by mass.

[13] A negative electrode sheet comprising a sheet-like current collector and a negative electrode layer covering the current collector, the negative electrode layer comprising a binder and the negative electrode material for a lithium-ion secondary battery according to any one of [1] to [12].

[14] A lithium-ion secondary battery having a negative electrode comprising the negative electrode sheet according to [13].

Advantageous Effects of Invention

According to the negative electrode material for a lithium-ion secondary battery of the present invention, Si is distributed uniformly and at a high concentration in the composite (C), there is no lump of Si, and there are few pores into which Si cannot enter, so that a lithium-ion secondary battery having a high capacity can be provided.

DESCRIPTION OF EMBODIMENTS

Next, an embodiment of the present invention will be specifically described.

A negative electrode material for a lithium-ion secondary battery according to the present embodiment contains a composite (C) containing a specific porous carbon (A) and a Si-containing compound (B), and the Si-containing compound (B) is contained in pores of the porous carbon (A).

<1> Porous Carbon (A)

The porous carbon (A) satisfies $V_1/V_0>0.80$ and $V_2/V_0<0.10$, when the total pore volume at the maximum value of the relative pressure $P/P_0$ is defined as $V_0$ and $P_0$ is the saturated vapor pressure, the cumulative pore volume at the relative pressure $P/P_0=0.1$ is defined as $V_1$, the cumulative pore volume at the relative pressure $P/P_0=10^{-7}$ is defined as $V_2$ in a nitrogen adsorption test, and has a BET specific surface area of 800 m$^2$/g or more.

To investigate the pore distribution of the porous carbonaceous material, an adsorption isotherm by a gas adsorption method, for example, is analyzed by a known method. The adsorption gas in the measurement is nitrogen gas in the present embodiment. That is, a nitrogen adsorption test is performed.

The adsorption isotherm obtained by the nitrogen adsorption test is a curve in which the horizontal axis represents the relative pressure and the vertical axis represents the adsorption amount of the adsorption gas. At a lower relative pressure, the adsorption gas is adsorbed in pores having a smaller diameter. As used herein, pores corresponding to nitrogen adsorption volumes in the range of $P/P_0 \leq 0.1$ are defined as micropores, pores corresponding to nitrogen adsorption volumes in the range of $0.1<P/P_0<0.96$ are defined as mesopores, and pores corresponding to nitrogen adsorption volumes in the range of $0.96<P/P_0$ are defined as macropores. It is difficult to uniquely determine the pore size from the adsorption isotherm, but by general definition, "mesopores" are pores having a diameter of about 2 nm to about 50 nm, "micropores" are pores having a diameter less than about 2 nm, and "macropores" are pores having a diameter greater than about 50 nm.

The maximum value of the relative pressure $P/P_0$ is the ratio of the maximum attainable pressure of nitrogen gas to the saturated vapor pressure $P_0$ of nitrogen gas under the measuring apparatus and conditions used in the nitrogen adsorption test. Although the maximum value of the relative pressure $P/P_0$ is theoretically 1, there are cases, for example, where the maximum value cannot reach 1 due to restrictions of the measuring apparatus, so that the maximum value of the relative pressure $P/P_0$ may be 0.985 or more and 1 or less.

$V_0$ represents the total pore volume [cm$^3$/g] in the standard state (0° C., 1 atm), $V_1$ represents the sum of the volumes [cm$^3$/g] of the micropores in the standard state (0° C., 1 atm), and $V_2$ represents the volume of very small micropores [cm$^3$/g] in the standard state (0° C., 1 atm). Therefore, when $V_1/V_0$ is greater than 0.80, it means that the ratio of the micropores to the total pores is large, and at the same time, means that the ratio of the mesopores and the macropores is small. When the ratio of mesopores or macropores is small, the ratio of the Si-containing compound (B) having the size of mesopores or macropores formed in the composite (C) is reduced when the Si-containing compound (B) is precipitated in the pores. That is, lumps of the Si-containing compound (B) can be reduced. From this viewpoint, $V_1/V_0$ is preferably 0.85 or more and more preferably 0.90 or more.

The fact that $V_2/V_0$ is smaller than 0.10 means that the abundance ratio of very small micropores that the Si-containing gas cannot enter is small. Therefore, it is possible to prevent a situation in which the battery capacity is low due to the large number of pores in which the Si-containing compound (B) is not precipitated. "Very small micropores" means pores having a diameter of about 0.41 nm or less as measured by the Horvath-Kawazoe method (HK method). From this viewpoint, $V_2/V_0$ is preferably 0.095 or less and more preferably 0.09 or less.

Further, in the negative electrode material for a lithium-ion secondary battery according to the present embodiment, it is preferable that the porous carbon (A) satisfies $V_3/V_0>0.50$ when the cumulative pore volume at the relative pressure $P/P_0=10^{-2}$ is defined as $V_3$ in the nitrogen adsorption test. More preferably, $V_3/V_0 \geq 0.60$ is satisfied, and still more preferably $V_3/V_0$ 0.70 is satisfied.

$V_3$ represents the sum of volumes [cm$^3$/g] of the pores having a diameter corresponding to the nitrogen adsorption volume in the range where the relative pressure $P/P_0$ of $10^{-2}$ or less in the standard state (0° C., 1 atm). Here, it is considered that the Si-containing compound (B) is less likely to be precipitated in pores having a diameter smaller than the diameter of the pores. When $V_3/V_0$ is within the above range, the composite (C) can contain pores in which the Si-containing compound (B) is not precipitated at a constant ratio. As a result, when lithium is inserted and deinserted, the pores in which Si is not precipitated absorb the volume change due to the expansion and contraction of the Si-containing compound (B), so that the expansion and contraction of the composite (C) as a whole are suppressed, and the expansion of the electrode is also suppressed. Therefore, the durability in long-term use of the lithium-ion secondary battery can be improved.

On the other hand, when $V_3/V_0$ becomes too large, it becomes more difficult for Si to precipitate. Therefore, it is preferable that $V_3/V_0<0.90$ is satisfied. In the present embodiment, the total pore volume $V_0$ in the nitrogen adsorption test of the porous carbon (A) is preferably 0.4 cm$^3$/g or more and less than 1.0 cm$^3$/g, more preferably 0.7 cm$^3$/g or more and less than 1.0 cm$^3$/g. When the porous carbon (A) having $V_0$ within such a range is used, the Si content can be increased, so that the amount of lithium inserted into the composite (C) can be increased. The total pore volume $V_0$ is a value calculated by multiplying the cumulative volume of nitrogen gas adsorbed on the porous carbon (A) at the maximum $P/P_0$ obtained in the range of 0.985 or more and 1.000 or less in the nitrogen adsorption test by the volume [cm$^3$/cm$^3$] of nitrogen gas at 0° C., 1 atm, 1 cm$^3$ in the liquid state at 77 K.

The porous carbon (A) has a BET specific surface area of 800 m$^2$/g or more. With such a BET specific surface area, a large amount of Si can be precipitated on the inner and outer surfaces of the porous carbon (A), so that a sufficiently high specific capacity as a negative electrode material can be obtained. From this viewpoint, the BET specific surface area of the porous carbon (A) is preferably 900 m$^2$/g or more, and more preferably 1000 m$^2$/g or more.

The BET specific surface area is calculated from the above-described adsorption isotherm using the BET method. The data range of the adsorption isotherm used in the calculation is set according to a known method.

Even after the composite (C) is obtained, by selecting appropriate conditions, the Si-containing compound (B) can be eluted from the pores and the surface of the composite (C), and the porous carbon (A) as a carrier can be recovered in the same state of impurity concentration, pore distribution, and specific surface area as before the composite (C) is obtained. Thereby, the physical property values of the porous carbon (A) can be investigated even from the state of the composite (C). For example, the BET specific surface area, $V_0$, $V_1$, $V_2$, and $V_3$ can be determined by a nitrogen adsorption test.

Examples of the appropriate conditions include stirring the composite (C) at a temperature of 50° C. for 1 to 5 days in a 0.5 mol/L aqueous KOH-solution, evacuating every other day, and then filtering, washing, and drying.

The porous carbon (A) preferably has a 50% particle size in the volume-based cumulative particle size distribution, $D_{V50}$, of 2.0 μm or more. $D_{V50}$ can be measured by laser diffraction method. When $D_{V50}$ of the porous carbon (A) is 2.0 μm or more, the powder of the carbon-coated Si—C composite particles is excellent in handleability, a slurry having a viscosity and a density suitable for coating is easily prepared, and the density of the electrode is easily increased. From this viewpoint, $D_{V50}$ is more preferably 3.0 μm, and still more preferably 5.0 μm or more.

When $D_{V50}$ of the porous carbon (A) is 30.0 μm or less, the diffusion length of lithium in each particle is short, and thus the rate characteristics of a lithium-ion battery are excellent, and in addition, stripping or abnormal unevenness do not occur when the slurry is applied to a current collector. From this viewpoint, $D_{V50}$ is more preferably 25.0 μm or less, and still more preferably 20.0 μm or less.

The porous carbon (A) has an average aspect ratio of 1.00 or more, and preferably 2.50 or less. When the average aspect ratio is close to 1.00, the porous carbon (A) becomes more spherical.

When the average aspect ratio of the porous carbon (A) is within the above range, even if the negative electrode material for a lithium-ion secondary battery expands and contracts due to expansion and contraction of Si in association with the insertion and deinsertion of lithium, the direction becomes isotropic, so that the cycle characteristics are improved, the silane gas of the silicon source easily efficiently enters into the porous carbon, and the porous carbon (A) itself has good handleability.

In the present embodiment, the aspect ratio is defined as the ratio of the major axis to the minor axis when the image of the porous carbon (A) by a scanning electron microscope (SEM) is analyzed by image analysis software and the shape of the porous carbon (A) is approximated to an elliptical shape having the highest correlation coefficient. Such an analysis is performed on 100 porous carbon (A) particles randomly selected from the SEM photograph, and the obtained aspect ratios are averaged to define an average aspect ratio. Examples of the image analysis software includes ImageJ (developed at US National Institutes of Health).

The shape of the porous carbon (A) is not particularly limited, and any shape such as a spherical shape, a columnar shape, a prismatic shape, and a polyhedral shape can be adopted.

<2> Si-Containing Compound (B)

The negative electrode material for a lithium-ion secondary battery of the present embodiment contains a Si-containing compound (B). The Si-containing compound (B) is not particularly limited as long as it contains silicon, but is one or more selected from silicon elemental substance, silicon oxide, and silicon carbide. Preferred is one or more selected from silicon elemental substance and silicon oxide. Examples of silicon oxides include $SiO_x$ ($0<x\leq2$).

The fact that the Si-containing compound (B) contains the compound as described above can be clarified by, for example, SEM-EDX measurement of the cross-section of the composite (C).

<3> Composite (C)

The negative electrode material for a lithium-ion secondary battery of the present embodiment contains a composite (C). The composite (C) contains the porous carbon (A) and the Si-containing compound (B). The composite (C) has a structure in which the Si-containing compound (B) is contained in the pores of the porous carbon (A). By adopting such a structure, the negative electrode material can have excellent cycle characteristics as a negative electrode material for a lithium-ion secondary battery.

The Si-containing compound (B) may be present on the surface of the composite (C).

By performing the SEM-EDX measurement of the cross-section of the composite (C), it is possible to confirm whether the Si element is present in the pores of the composite (C) and whether the Si element is present on the surface of the composite (C).

The Si content in the composite (C) is preferably 15% by mass or more. When the Si content is 15% by mass or more, the composite (C) can have a high specific capacity. From this viewpoint, the content of the Si content is more preferably 20% by mass or more, and still more preferably 30% by mass or more.

The specific capacity is the amount of electricity exchanged by the active material divided by the mass of the active material. In general, the specific capacity can be determined by dividing the capacity obtained in a half cell by the mass of the active material used.

The Si content in the composite (C) is preferably 85% by mass or less. By setting the content to 85% by mass or less, the porous carbon (A) serving as the carrier can sufficiently absorb the volume change due to expansion and contraction thereof. From this viewpoint, the content of the Si content is more preferably 80% by mass or less, and still more preferably 75% by mass or less.

As used herein, the "Si content" is the mass of silicon element in the mass of the composite (C) expressed as a percentage. The Si content in the composite (C) can be measured by subjecting the composite (C) to X-ray fluorescence analysis using, for example, a fundamental parameter method (FP method).

The sum of pore volumes per gram of the porous carbon (A) is expressed as $V_0$ cm$^3$ using the total pore volume $V_0$. Assuming that all of them are occupied by Si, the composite (C) contains Si in a mass corresponding to the $V_0$ cm$^3$. In this case, the theoretical maximum supported amount of Si for 1 g of the porous carbon (A) is $V_0 \times 1 \times 2.32$ g, where the true density of Si is 2.32 g/cm$^3$.

Therefore, when the Si content at this time is called the "theoretical Si content", $$\text{theoretical Si content}(\%)=(V_0\,[\text{cm}^3/\text{g}]\times 1\,[\text{g}]\times 2.32\,[\text{g}/\text{cm}^3])/((V_0\,[\text{cm}^3/\text{g}]\times 1\,[\text{g}]\times 2.32\,[\text{g}/\text{cm}^3])+1\,[\text{g}])\times 100$$

is satisfied.

The Si content in the composite (C) according to the present embodiment is preferably 15% or more and 95% or less with respect to the theoretical value. When the Si content is in such a range with respect to the theoretical value, the composite (C) has a sufficient specific capacity and voids for absorbing the expansion and contraction of Si, and therefore has excellent cycle characteristics.

Si has a peak at 460 to 490 cm$^{-1}$ in the Raman spectrum measured by Raman spectroscopy. As used herein, the intensity of this peak is referred to as $I_{Si}$. It is preferable that the peak is present at 460 to 490 cm$^{-1}$, and it is still more preferable that the peak is not present at 510 to 530 cm$^{-1}$. The peak intensity in the vicinity of 1350 cm$^{-1}$ is defined as $I_D$, and the peak intensity in the vicinity of 1590 cm$^{-1}$ is defined as $I_G$. The peak intensity is the height from the baseline to the peak apex after the baseline is corrected. The peak in the vicinity of 1350 cm$^{-1}$ and the peak in the vicinity of 1590 cm$^{-1}$ are carbon-derived.

The composite (C) according to the present embodiment preferably has a peak intensity ($I_{Si}$) to peak intensity ($I_G$) ratio ($I_{Si}/I_G$) of less than 0.30. The fact that the peak of Si appears in the Raman spectrum indicates that Si is deposited in the vicinity of the surface of the composite (C), but when the ($I_{Si}/I_G$) is less than 0.30, Si is mainly deposited inside the pores of the porous carbon (A) and is hardly precipitated on the surface of the particles of the porous carbon (A), and this leads to an improvement in cycle characteristics in that Si is not in direct contact with the electrolytic solution and that the porous carbon (A) absorbs expansion and contraction of Si. From the same viewpoint, $I_{Si}/I_G$ is more preferably 0.25 or less, and still more preferably 0.20 or less.

The composite (C) according to the present embodiment preferably has a 50% particle size in the volume-based cumulative particle size distribution, $D_{V50}$, of 2.0 μm or more. When $D_{V50}$ is 2.0 μm or more, the powder is excellent in handleability, a slurry having a viscosity and a density suitable for coating is easily prepared, and the density of the electrode is easily increased. From this viewpoint, $D_{V50}$ is more preferably 3.0 µm or more, and still more preferably 4.0 µm or more.

The $D_{V50}$ of the composite (C) according to the present embodiment is preferably 30.0 µm or less. When $D_{V50}$ is 30.0 µm or less, the diffusion length of lithium in each particle is short, and thus the rate characteristics of a lithium-ion battery are excellent, and in addition, stripping or abnormal unevenness do not occur when the slurry is applied to a current collector. From this viewpoint, $D_{V50}$ is more preferably 27.5 µm or less, and still more preferably 25.0 µm or less.

The $D_{V10}$ of the composite (C) according to the present embodiment is preferably 1.0 µm or more, more preferably 1.5 µm or more, and still more preferably 2.0 µm or more. When $D_{V10}$ is 1.0 µm or more, the composite (C) is less likely to aggregate, and stripping or abnormal unevenness do not occur when the slurry is applied to a current collector.

$D_{V50}$ and $D_{V10}$ indicate the 50% particle size ($D_{V50}$) and the 10% particle size ($D_{V10}$) in the volume-based cumulative particle size distribution by laser diffraction method.

In the composite (C) according to the present embodiment, the BET specific surface area is preferably 40.0 m²/g or less. When the BET specific surface area is 40.0 m²/g or less, the decomposition reaction of the electrolytic solution, which is a side reaction, hardly occurs, and the coulombic efficiency can be increased. From this viewpoint, the BET specific surface area is more preferably 35.0 m²/g or less, and still more preferably 30.0 m²/g or less.

The BET specific surface area is preferably 0.5 m²/g or more. When the BET specific surface area is 0.5 m²/g or more, the insertion and deinsertion of lithium becomes easy, and the cycle characteristics can be improved. From this viewpoint, the BET specific surface area is more preferably 1.0 m²/g or more, and still more preferably 1.5 m²/g or more. The BET specific surface area can be measured by the method described in Examples.

The composite (C) according to the present embodiment preferably has an average aspect ratio of 1.00 or more and 2.50 or less.

When the average aspect ratio of the composite (C) is within the above range, even if the negative electrode material for a lithium-ion secondary battery expands and contracts due to expansion and contraction of Si in association with the insertion and deinsertion of lithium, the direction becomes isotropic, so that the cycle characteristics are improved, the silane gas of the silicon source easily efficiently enters into the porous carbon, and the composite (C) itself has good handleability.

As used herein, the aspect ratio is defined as the ratio of the major axis to the minor axis when the image of the composite (C) by a scanning electron microscope (SEM) is analyzed by image analysis software and the shape of the composite (C) is approximated to an elliptical shape having the highest correlation coefficient. Such an analysis is performed on 100 composite (C) particles randomly selected from the SEM photograph, and the obtained aspect ratios are averaged to define an average aspect ratio. Examples of the image analysis software includes ImageJ (developed at US National Institutes of Health).

In the composite (C) according to the present embodiment, R value ($I_D/I_G$), which is a ratio of a peak intensity ($I_D$) in the vicinity of 1350 cm⁻¹ and a peak intensity ($I_G$) in the vicinity of 1580 cm⁻¹ in a Raman spectrum, is preferably 0.50 or more. When R value is 0.50 or more, the reaction resistance is sufficiently low, which leads to an improvement in the coulombic efficiency of the battery. From this viewpoint, R value is more preferably 0.60 or more, and still more preferably 0.70 or more.

R value is preferably less than 1.50. The fact that R value is less than 1.50 means that there are few defects on the surface of the composite (C), and the side reaction is reduced, so that the initial coulombic efficiency is improved. From this viewpoint, R value is more preferably 1.40 or less, and still more preferably 1.30 or less.

In the composite (C) according to the present embodiment, in the XRD pattern measured by powder XRD using a Cu—Kα ray, the full width at half maximum of the peak of the 111 plane of Si is preferably 3.00° or more. When the full width at half maximum is 3.00° or more, the crystallite size small and the amorphous property is high, which leads to suppression of cracking of Si particles accompanying charge/discharge, so that the cycle characteristics can be improved. From this viewpoint, the full width at half maximum of the peak of the 111 plane of Si is more preferably 3.50° or more, and still more preferably 4.00° or more.

In the composite (C) according to the present embodiment, in the XRD pattern measured by powder XRD using a Cu—Kα ray, (peak intensity of 111 plane of SiC)/(peak intensity of 111 plane of Si) is preferably 0.01 or less. Accordingly, since SiC (silicon carbide) is not contained in the composite (C) or the content of SiC is extremely low, the utilization rate of Si as a battery active material is improved, and the initial discharge capacity can be increased. The (peak intensity of 111 plane of SiC)/(peak intensity of 111 plane of Si) is also referred to as $I_{SiC111}/I_{Si111}$. The lower limit of $I_{SiC111}/I_{Si111}$ is 0. That is, it is more preferable that the peak of SiC is not observed. Here, the term "peak intensity" refers to the height from the baseline to the peak apex after the baseline is corrected.

<4> Method for Producing Composite (C)

The composite (C) according to the present embodiment can be produced, for example, by the following steps (1) and (2).

Step (1): a step of preparing porous carbon (A) which satisfies $V_1/V_0>0.8$ and $V_2/V_0<0.1$, when the total pore volume at the maximum value of the relative pressure $P/P_0$ is defined as $V_0$, the cumulative pore volume at the relative pressure $P/P_0=0.1$ is defined as $V_1$, and the cumulative pore volume at the relative pressure $P/P_0=10^{-7}$ is defined as $V_2$ in the nitrogen adsorption test, and has the BET specific surface area of 800 m²/g or more.

Step (2): step of allowing a Si-containing gas such as a silane gas to act on the heated porous carbon to precipitate the Si-containing compound (B) on a surface and in pores of the porous carbon to obtain the composite (C) containing the porous carbon and Si.

(Step (1))

Examples of the method for producing the porous carbon (A) include adjusting the conditions for thermally decomposing resins and organic substances while examining changes in $V_0$, $V_1$, $V_2$, $V_3$, and BET specific surface area, or carbonaceous materials such as carbon black are subjected to, for example, oxidation treatment and activation treatment so as to have the above-described characteristics. As the carbon precursor, those described in Patent Literature 2 can be freely used, but a phenolic resin and a copolymer of resorcinol and formaldehyde are preferable. Prior to carbonization, the resin may be cured by heat treatment at 150° C. to 300° C. for 1 to 6 hours. Further, after curing, the resin may be crushed to have a particle size of about 0.5 to 5.0 mm.

Preferably, the resin can be produced by carbonization by holding the resin at a temperature of 400° C. to 1100° C. for 1 to 20 hours in an inert atmosphere.

The obtained carbide is subjected to a nitrogen adsorption test, and in a case where the values of pore distribution and BET specific surface area are not desirable, the activation treatment is performed as necessary. The carbide is heated to 800° C. to 1100° C. under an inert atmosphere, then switched to $CO_2$ gas, and held at that temperature for 1 to 20 hours. By this treatment, pores are further developed in the carbide.

In order to examine the pore distribution and the BET specific surface area of the obtained activated material and to adjust these, a heat treatment may also be further performed in an inert gas such as Ar. The temperature is 1000° C. to 2000° C. and the temperature is maintained for 1 to 20 hours. By this treatment, the pores are reduced, and the porous carbon (A) having a desired $V_0$, $V_1$, $V_2$, $V_3$, and BET specific surface area can be obtained.

Alternatively, a commercially available active carbon having a desired physical property values may be purchased.
(Step (2))

The step (2) is a CVD step in which a Si-containing gas, preferably a silane gas, is allowed to act on the heated porous carbon (A) to cause thermal decomposition of the Si-containing gas on a surface and in pores of the porous carbon (A), so as to precipitate the Si-containing compound (B) on the surface and in the pores of the porous carbon (A) to obtain the composite (C).

For example, when the porous carbon is placed in a chamber of a CVD apparatus and a silane gas is allowed to act on the porous carbon in a heated state, silane enters the inside the pores of the porous carbon and is further thermally decomposed, whereby Si can be precipitated in the pores of the porous carbon. As a method therefor, for example, an apparatus and a method disclosed in Patent Literature 1 can be used.

Silane decomposition also occurs on the surface of the porous carbon (A), and Si precipitates. In general, since the surface area of the pores of the porous carbon (A) is much larger than the external area, the amount of Si precipitated in the pores of the porous carbon (A) is overwhelmingly large, but when the supported amount of Si is increased or the treatment is performed at a higher temperature, the precipitation on the surface of the porous carbon (A) may become remarkable.

Examples of the Si-containing gas used include disilane and trisilane, in addition to the silanes listed above. Further, the Si-containing gas may contain other gases, and for example, gases such as nitrogen gas, argon, helium, and hydrogen gas may be mixed as the carrier gas. Various conditions of CVD, such as gas composition ratio, gas flow rate, temperature program, and fixed bed/fluidized bed selection, can be adjusted as appropriate while observing the nature of the product.

In a case where silane gas is used, the treatment is carried out at a treatment temperature of 360° C. to 450° C., more preferably 370° C. to 420° C., and still more preferably 380° C. to 400° C. In this temperature range, Si can be efficiently precipitated in the pores of the porous carbon (A), and the composite (C) can be obtained.

Alternatively, after the Si-containing compound (B) is precipitated in the pores of the porous carbon to obtain the composite (C), the composite (C) may be brought into contact with an inert gas atmosphere containing oxygen to oxidize the surface of the Si-containing compound (B). In particular, since pure Si has high activity, rapid deterioration of the composite (C) can be suppressed by oxidizing the surface. The amount of oxygen required for such oxidation of the surfaces of the Si-containing compound (B) is preferably about 0.01 to 0.18 moles per mole of Si in the composite (C).

After the Si precipitation or oxidation, a separate coating layer may be formed on the particle surface of the composite (C). Specific examples thereof include carbon coating, inorganic oxide coating, and polymer coating. Examples of the techniques of the carbon coating include chemical vapor deposition (CVD) and physical vapor deposition (PVD). Examples of the techniques of the inorganic oxide coating include CVD, PVD, atomic layer deposition (ALD) and wet methods. The wet method includes a method of coating composite (C) with a liquid obtained by dissolving or dispersing a precursor of an inorganic oxide (metal carboxylate or alkoxide) in a solvent, and removing the solvent by, for example, heat treatment. As the type of polymer coating, a method of coating using a polymer solution, a method of coating using a polymer precursor containing a monomer and polymerizing by applying, for example, temperature or light, or a combination thereof may be used.

The inorganic oxide is preferably one or more selected from the group consisting of oxides of Al, Ti, V, Cr, Mn, Fe, Co, Ni, Y, Zr, Mo, Nb, La, Ce, Ta, and W and Li-containing oxides.

The coating layer may be a single layer or a combination of a plurality of layers.

In order to prevent silicon in the composite (C) particles from reacting with carbon to form silicon carbide, it is preferable to treat at a temperature of less than 800° C. when the raising the temperature during coating.

The coating layer provided on the surface of the composite (C) particles can be examined by analyzing the particle surface. Examples thereof include SEM-EDS, Auger electron spectroscopy, X-ray photoelectron spectroscopy (XPS), micro-infrared spectroscopy, and micro-Raman spectroscopy.

Examples of the effects of coating include (1) suppression of oxidation over time of the Si-containing compound (B) inside the composite (C), (2) increase in initial coulombic efficiency in a lithium-ion secondary battery, and (3) improvement in cycle characteristics in the battery, as described below.

(1) Suppression of Oxidation Over Time of Si-Containing Compound (B) Inside Composite (C)

When the composite (C) is exposed to air or an oxygen-containing gas atmosphere, the Si-containing compound (B) is oxidized with the lapse of time. The presence of the coating layer on the surface of the composite (C) can suppress air or an oxygen-containing gas from entering the inside of the composite (C).

(2) Increase in Initial Coulombic Efficiency in Lithium-Ion Secondary Battery

When an electrolytic solution decomposition product film (solid electrolyte interface <SEI> film) is formed on the surface of the composite (C) or a lithium ion entry port into the composite (C) after lithium ions are first inserted into the composite (C) in the lithium-ion battery, lithium ions that cannot be deinserted from the closed pores in the composite (C) are present, and thus the initial coulombic efficiency is reduced. Since the SEI film is present at the time of the second and subsequent lithium ion insertions, the ratio of lithium ions trapped in the composite (C) is greatly reduced. Here, the presence of the coating layer on the surface of the composite (C) prevents the insertion of lithium ions into the pores that are easily closed by the SEI film, thereby improving the initial coulombic efficiency.

(3) Improvement of Cycle Characteristics in Lithium-Ion Secondary Battery

It is considered that when charging and discharging are repeated in a lithium-ion battery, the Si-containing compound (B) in the composite (C) reacts with fluorine which is a component element of the electrolytic solution, and is eluted as a silicon fluoride. When the Si-containing compound (B) elutes, the specific capacity of the composite (C) decreases. When the coating layer is present on the surface of the composite (C), the elution of the Si-containing compound (B) is suppressed, and thus the capacity decrease of the composite (C) is suppressed, and thus the cycle characteristics are improved.

<5> Polymer-Coated Composite

In the present embodiment, inorganic particles and a polymer may be present on at least a portion of the surface of the composite (C). Such a composite (C) is sometimes referred to herein as "polymer-coated composite".

<5-1> Inorganic Particles

Examples of the inorganic particles include metal oxides such as titanium oxide, niobium oxide, yttrium oxide, and aluminum oxide; lithium-containing oxides such as lithium titanate; and conductive particles containing carbon as a main component such as graphite, hard carbon, soft carbon, and carbon black. Two or more of these can be selected and used. The inorganic particles may be present on the surface of the composite (C) from the viewpoint of improving the cycle characteristics, and the presence or absence of which can be confirmed by the adhesion of protrusions when observed by scanning electron microscope (SEM). The content of the inorganic particles is preferably 1.0% by mass to 10.0% by mass, more preferably 2.0% by mass to 9.0% by mass, still more preferably 3.0% by mass to 8.0% by mass of the entire composite (C).

The particle size of the inorganic particles is preferably smaller than that of the polymer-coated composite particles, and more preferably ½ or less. This is because the inorganic particles are likely to be present on the surface of the composite (C).

The inorganic particles are still more preferably conductive particles having carbon as a main component, and the electrical conductivity of the composite (C) can be increased.

The type of conductive particles is not particularly limited. For example, the conductive particles is preferably at least one selected from the group consisting of granular graphite and carbon black, and granular graphite is preferable from the viewpoint of improving cycle characteristics. Examples of granular graphite include particles such as artificial graphite, natural graphite, and mesophase carbon (MC). Examples of carbon black include acetylene black, ketjen black, thermal black, and furnace black, and acetylene black is preferable from the viewpoint of conductivity.

The granular graphite preferably has high crystallinity from the viewpoint of improving both the battery capacity and charge/discharge efficiency. Specifically, the value of the average interplanar spacing ($d_{002}$) obtained by measuring the granular graphite based on the Gakushin method is preferably 0.335 nm to 0.347 nm, more preferably 0.335 nm to 0.345 nm, still more preferably 0.335 nm to 0.340 nm, and particularly preferably 0.335 nm to 0.337 nm. When the average interplanar spacing of the granular graphite is 0.347 nm or less, the crystallinity of the granular graphite is high, and both the battery capacity and the charge/discharge efficiency tend to be improved. On the other hand, since the theoretical value of the graphite crystal is 0.335 nm, when the average interplanar spacing of the granular graphite is close to this value, both the battery capacity and the charge/discharge efficiency tend to be improved.

The shape of the granular graphite is not particularly limited, and may be flat graphite or spherical graphite. From the viewpoint of improving cycle characteristics, flat graphite is preferable.

In the present disclosure, the flat graphite means graphite having an average aspect ratio of other than 1, that is, graphite having a short axis and a long axis. Examples of the flat graphite include graphite having a shape of, for example, a scale, a flake, and a lump.

The aspect ratio of the conductive particle is not particularly limited, but the average aspect ratio is preferably 3.3 or more, and more preferably 5.0 or more, from the viewpoint of easily ensuring conduction between the conductive particles and improving the cycle characteristics. The average aspect ratio of the conductive particles is preferably 1000 or less, more preferably 100 or less.

The definition of the average aspect ratio of the conductive particles is the same as for the composite (C).

The conductive particles may be either primary particles (single particles) or secondary particles (granulated particles) formed from a plurality of primary particles. Further, the flat graphite may be porous graphite particles.

<5-2> Polymer

It is considered that by containing the polymer, the specific surface area of the composite (C) is reduced and the reaction with the electrolytic solution is suppressed, so that the recovery rate after charge/discharge is improved.

The content of the polymer is preferably 0.1% by mass to 10.0% by mass in the entire composite (C). Within the above range, the effect of improving the recovery rate after charging/discharging tends to be sufficiently obtained while suppressing the decrease in conductivity. The content of the polymer in the composite (C) is preferably 0.2% by mass to 7% by mass, more preferably 0.2% by mass to 5.0% by mass.

The content of the polymer in the composite (C) can be confirmed by, for example, heating sufficiently dried polymer-coated composite to a temperature (for example, 300° C.) equal to or higher than a temperature at which the polymer decomposes and lower than a temperature at which the composite (C) and the inorganic particles decompose, and measuring the mass of the composite (C) after the polymer decomposes. Specifically, in a case where the mass of the composite (C) before heating is A g and the mass of the composite (C) after heating is B g, (A−B) is the content of the polymer. The content can be calculated as {(A−B)/A}×100.

The above measurement can also be carried out by using thermogravimetry (TG). This is preferable because the amount of sample required for measurement can be small and measurement can be performed with high accuracy.

The type of polymer is not particularly limited. Examples thereof include at least one selected from the group consisting of polysaccharides, cellulose derivatives, animal water-soluble polymers, lignin derivatives, and water-soluble synthetic polymers.

Specific examples of the polysaccharide include starch derivatives such as starch acetate, starch phosphate, carboxymethyl starch, and hydroxyalkyl starches such as hydroxyethyl starch, dextrin, dextrin derivatives, cyclodextrin, alginic acid, alginic acid derivatives, sodium alginate, agarose, carrageenan, xyloglucan, glycogen, tamarind seed gum, pullulan, and pectin.

Examples of the cellulose derivative include carboxymethyl cellulose, methyl cellulose, hydroxyethyl cellulose, and hydroxypropyl cellulose.

Examples of the animal water-soluble polymer include casein and gelatin.

Examples of the water-soluble synthetic polymer include water-soluble acrylic polymers, water-soluble epoxy polymers, water-soluble polyesters, water-soluble polyamides, and water-soluble polyethers, and more specific examples thereof include polyvinyl alcohol, polyacrylic acid, polyacrylate, polyvinyl sulfonic acid, polyvinyl sulfonate, poly(4-vinylphenol), poly(4-vinylphenol) salt, polystyrene sulfonic acid, polystyrene sulfonate, polyaniline sulfonic acid, polyacrylamide, polyvinylpyrrolidone, and polyethylene glycol. The polymer may be used in the form of, for example, a metal salt and an alkylene glycol ester.

In the present embodiment, the polymer preferably contains one or more selected from the group consisting of polysaccharides, cellulose derivatives, gelatin, casein, and water-soluble polyethers as the first component, and one or more selected from the group consisting of monosaccharides, disaccharides, oligosaccharides, amino acids, gallic acid, tannin, saccharin, saccharin salts and butynediol as the second component. In the present embodiment, the polysaccharide means a compound having a structure in which 10 or more monosaccharide molecules are bonded, and the oligosaccharide means a compound having a structure in which 3 to 10 monosaccharide molecules are bonded.

Specific examples of the polysaccharide include the polysaccharides described above.

Specific examples of the cellulose derivative include the cellulose derivatives described above.

Specific examples of the water-soluble polyether include polyalkylene glycols such as polyethylene glycol.

Specific examples of the monosaccharide include arabinose, glucose, mannose, and galactose.

Specific examples of the disaccharide include sucrose, maltose, lactose, cellobiose, and trehalose.

Specific examples of the oligosaccharide include raffinose, stachyose, and maltotriose.

Specific examples of the amino acid include glycine, alanine, valine, leucine, isoleucine, serine, threonine, cysteine, cystine, methionine, aspartic acid, glutamic acid, lysine, arginine, phenylalanine, tyrosine, histidine, tryptophan, proline, oxyproline, and glycylglycine.

Specific examples of the tannin include tea catechin and persimmon catechin.

The first component preferably contains at least one polysaccharide, more preferably at least one selected from the group consisting of starch, dextrin, and pullulan. It is considered that the first component is present to cover a portion or all of the surface of the composite (C), thereby reducing their specific surface area. As a result, the reaction between the composite (C) and the electrolytic solution is suppressed, and the cycle performance can be improved.

The second component preferably contains at least one selected from the group consisting of disaccharides and monosaccharides, and more preferably contains at least one selected from the group consisting of maltose, lactose, trehalose, and glucose. It is considered that the second component is incorporated into the first component and suppresses the solubility of the precipitate film formed from the first component in water or the electrolytic solution. By using the second component in combination, the surface of the composite (C) can be strongly coated, and the binding force of the inorganic particles can also be improved. Therefore, the cycle characteristics can be improved.

From the same viewpoint, in a case where the polymer contains the first component and the second component, the mass ratio thereof (first component:second component) is preferably 1:1 to 25:1, more preferably 3:1 to 20:1, and still more preferably 5:1 to 15:1.

The method of allowing the polymer to be present on a portion or all of the surface of the composite (C) is not particularly limited. For example, the inorganic particles may be dispersed in a liquid in which the polymer is dissolved or dispersed, the composite (C) is added thereto, followed by stirring as necessary, so that the polymer adheres to the composite (C). Thereafter, the composite (C) to which the polymer is adhered is taken out of the liquid and dried as necessary, thereby enabling to obtain the composite (C) to which the polymer is adhered on the surface.

The temperature of the solution during stirring is not particularly limited, and can be selected from, for example, 5° C. to 95° C. In a case where the solution is heated, the concentration of the solution may change due to distillation of the solvent used in the solution. To avoid this, it is necessary to prepare the solution in a closed vessel or to reflux the solvent. When the polymer is allowed to be uniformly present on a portion or all of the surface of the composite (C), the treatment may be performed while distilling off the solvent. The stirring atmosphere is not particularly limited as long as the performance of the composite (C) is not impaired.

The temperature during drying is not particularly limited as long as the polymer is not decomposed and distilled off, and can be selected from, for example, 50° C. to 200° C. Drying in an inert atmosphere or under vacuum may be carried out.

The content of the polymer in the solution is not particularly limited and can be selected from, for example, 0.1% by mass to 20% by mass.

The solvent used for the solution can be any solvent capable of dissolving and dispersing the polymer and the precursor of the polymer. Examples thereof include those used as solvents such as water, alcohols such as acetonitrile, methanol, ethanol, and 2-propanol, ketones such as acetone and methyl ethyl ketone, and esters such as ethyl acetate and n-butyl acetate, and two or more of these may be mixed and used. If necessary, an acid or a base may be added to adjust the pH of the solution. Known acids and bases can be selected and used.

<6> Negative Electrode Material for Lithium-Ion Secondary Battery

A negative electrode material for a lithium-ion secondary battery according to an embodiment of the present invention contains the composite (C). Further, the negative electrode material for a lithium-ion secondary battery according to the present embodiment may contain components other than the composite (C). Examples thereof include a carbonaceous layer and a metal oxide layer that cover the composite (C).

As the negative electrode material for a lithium-ion secondary battery according to the present embodiment, the composite (C) of the present embodiment may be used alone or in combination with other negative electrode materials. In a case where other negative electrode materials are used together, the composite (C) and other negative electrode materials are usually mixed and used. Examples of other negative electrode materials include those generally used as negative electrode material for a lithium-ion secondary battery. Examples thereof include graphite, hard carbon, lithium titanate ($Li_4Ti_5O_{12}$), alloy-based negative electrode active materials such as silicon (Si) and tin (Sn), and composite materials thereof. These negative electrode materials are usually in the form of particles. The negative electrode material other than the composite (C) may be used alone or in combination of two or more kinds thereof. Among them, graphite and hard carbon are particularly preferably used. As used herein, the "negative electrode material" refers to a negative electrode active material or a composite of a negative electrode active material and another material.

<7> Negative Electrode Layer, Negative Electrode Sheet, Negative Electrode

A negative electrode layer of an embodiment according to the present invention includes the negative electrode material for a lithium-ion secondary battery described in <5> above and a binder. In the negative electrode layer, the composite (C) functions as a negative electrode material. In particular, the negative electrode layer of the present embodiment can be preferably used as a negative electrode layer for a lithium-ion secondary battery.

A method for producing the negative electrode layer may be, for example, a known method as described below. A negative electrode material, a binder, and a solvent are used to prepare a slurry for forming a negative electrode mixture. The slurry is applied to a sheet-like current collector such as copper foil and dried. This is further vacuum-dried, and roll-pressed. The pressure in the roll-pressing is usually 100 to 500 MPa. The obtained product has a sheet-like current collector and a negative electrode layer covering the current collector, and is referred to as a negative electrode sheet herein.

The negative electrode sheet according to the present embodiment includes a negative electrode layer and a sheet-like current collector. The negative electrode sheet is then cut or punched into a desired shape and size.

A negative electrode sheet in a state of being adjusted to a size and a shape to be incorporated into a lithium-ion secondary battery and further having a current collecting tab attached to a current collector as necessary is referred to herein as a negative electrode.

Any binder generally used in the negative electrode layer of a lithium-ion secondary battery can be freely selected and used as the binder. Examples thereof include polyethylene, polypropylene, ethylene-propylene terpolymer, butadiene rubber, styrene-butadiene rubber (SBR), butyl rubber, acrylic rubber, polyvinylidene fluoride (PVdF), polytetrafluoroethylene (PTFE), polyethylene oxide, polyepichlorohydrin, polyphosphazene, polyacrylonitrile, carboxymethyl cellulose (CMC) and salts thereof, polyacrylic acid, and polyacrylamide. The binder may be used alone or in combination of two or more kinds thereof. The amount of the binder is preferably 0.5 to 30 parts by mass based on 100 parts by mass of the negative electrode material.

The solvent for preparing the slurry for electrode coating is not particularly limited, and examples thereof include N-methyl-2-pyrrolidone (NMP), dimethylformamide (DMF), isopropanol (IPA), tetrahydrofuran (THF), and water. In the case of a binder using water as a solvent, a thickening agent is preferably used in combination. The amount of the solvent can be adjusted so that the slurry achieves such viscosity that the slurry is easily applied onto a current collector.

In the present invention, a conductive auxiliary agent may be contained in the negative electrode layer, if necessary.

The conductive auxiliary agent is not particularly limited as long as the conductive auxiliary agent plays a role in imparting electron conductivity and dimensional stability (absorbing action on volume change in association with insertion and deinsertion of lithium) to the electrode. Generally, those made of a conductive carbon material are used, and examples thereof include carbon nanotubes, carbon nanofibers, vapor grown carbon fibers (for example, "VGCF®-H" manufactured by Showa Denko K. K.), carbon black (for example, "DENKA BLACK®" manufactured by Denka Company Limited, "Super C65" manufactured by Imerys Graphite & Carbon, "Super C45" manufactured by Imerys Graphite & Carbon), and graphite (for example, "KS6L" manufactured by Imerys Graphite & Carbon and "SFG6L" manufactured by Imerys Graphite & Carbon). These may be used by mixing two or more kinds thereof. The amount of the conductive auxiliary agent is preferably 1 to 30 parts by mass based on 100 parts by mass of the negative electrode material.

In the present embodiment, carbon nanotubes, carbon nanofibers, and vapor grown carbon fibers are preferably contained, and the fiber length of these conductive auxiliary agent is preferably ½ or more of the length of $D_{v50}$ of the composite particles. With this length, these conductive auxiliary agent bridges between the negative electrode materials containing the composite (C) or the polymer-coated composite, and the cycle characteristics can be improved. Single-walled or multi-walled carbon nanotubes or carbon nanofibers having a fiber diameter of 15 nm or less are preferable because the number of bridges is further increased with the same amount of carbon nanotubes or carbon nanofibers added as compared with those having a larger fiber diameter. Since these are more flexible, these are more preferable from the viewpoint of improving the electrode density.

<8> Lithium-Ion Secondary Battery

A lithium-ion secondary battery of an embodiment according to the present invention contains the negative electrode layer. The lithium-ion secondary battery usually contains a negative electrode containing the negative electrode layer and a current collector, a positive electrode containing a positive electrode layer and a current collector, at least one of a nonaqueous electrolytic solution and a nonaqueous polymer electrolyte present therebetween, a separator, and a battery case accommodating these components. As long as the lithium-ion secondary battery includes the negative electrode, other configurations including conventionally known configurations can be employed without particular limitation.

The positive electrode layer usually contains a positive electrode material, and a binder. The positive electrode in the lithium-ion secondary battery may have a general configuration in a typical lithium-ion secondary battery. Further, if necessary, the positive electrode layer may contain a conductive auxiliary agent.

The positive electrode material is not particularly limited as long as electrochemical lithium insertion and deinsertion can be reversibly performed and the oxidation-reduction potential of these reactions is sufficiently higher than the standard oxidation-reduction potential of the negative electrode reaction. For example, $LiCoO_2$, $LiNiO_2$, $LiMn_2O_4$, $LiCo_{1/3}Mn_{1/3}Ni_{1/3}O_2$, $LiCo_{0.2}Mn_{0.2}Ni_{0.6}O_2$, $LiCo_{0.2}Mn_{0.1}Ni_{0.8}O_2$, carbon-coated $LiFePO_4$, or a mixture thereof can be suitably used.

As used herein, the "positive electrode material" refers to a positive electrode active material or a composite of a positive electrode active material and another material.

As the conductive auxiliary agent, the binder, the solvent for preparing the slurry, and the conductive auxiliary agent, those described in the section <6> Negative electrode can be used. Aluminum foil is preferably used as the current collector.

There is no particular limitation on the nonaqueous electrolytic solution and nonaqueous polymer electrolyte used in the lithium-ion secondary batteries. Examples of the nonaqueous electrolytic solution include an organic electrolytic solution in which a lithium salt such as $LiClO_4$, $LiPF_6$, $LiAsF_6$, $LiBF_4$, $LiSO_3CF_3$, and $CH_3SO_3Li$ is dissolved in a nonaqueous solvent such as ethylene carbonate, diethyl carbonate, dimethyl carbonate, ethyl methyl carbonate, propylene carbonate, butylene carbonate, acetonitrile, propionitrile, dimethoxyethane, tetrahydrofuran, and γ-butyrolactone.

Examples of the nonaqueous polymer electrolyte include a gel polymer electrolyte containing, for example, polyethylene oxide, polyacrylonitrile, polyvinylidene fluoride, and polymethyl methacrylate; and a solid polymer electrolyte containing, for example, a polymer having an ethylene oxide bond.

An additive for assisting the operation of the lithium-ion secondary battery may be added to the nonaqueous electrolytic solution. Examples of the substance include vinylene carbonate (VC), biphenyl, propanesultone (PS), fluoroethylene carbonate (FEC), and ethylene sultone (ES), which cause a decomposition reaction. VC and FEC are preferred. The amount to be added is preferably 0.01 to 20% by mass based on 100% by mass of the nonaqueous electrolytic solution.

The separator can be freely selected from materials that can be used in general lithium-ion secondary batteries, including combinations thereof, and examples thereof include microporous films made of polyethylene or polypropylene. In addition, it is also possible to use separators obtained by mixing particles such as $SiO_2$ or $Al_2O_3$ as fillers into such separators, or separators obtained by adhering the particles to the surfaces of such separators.

The battery case is not particularly limited as long as it can accommodate the positive electrode, the negative electrode, the separator, and the electrolytic solution. In addition to those standardized in the industry such as commercially available battery packs, 18650 cylindrical cell, and coin-shaped cells, the battery case, including those packed with aluminum packaging material, for example, can be freely designed and used.

The electrodes may be stacked and packed for use. The single cells can be connected in series and used as batteries or modules.

The lithium-ion secondary battery according to the present invention can be used as a power source for electronic devices such as smartphones, tablet PCs, and mobile information terminals; a power source for electric motors such as electric tools, vacuum cleaners, electric bicycles, drones, and electric vehicles; and storage of electric power obtained by, for example, fuel cells, solar power generation, and wind power generation.

EXAMPLES

Hereinafter, the present invention will be specifically described with reference to Examples and Comparative Examples, but the present invention is not limited to these Examples. Measurement of physical property values and battery evaluation were performed as follows.

[Nitrogen Adsorption Test]

The nitrogen adsorption test of the particles obtained in Examples and Comparative Examples was carried out by BELSORP-max II® manufactured by MicrotracBEL Corp.

Adsorption gas: Nitrogen gas

Pretreatment: Under vacuum, 400° C., 3 hours

Measurement relative pressure ($P/P_0$) lower limit: order $10^{-8}$

Measurement relative pressure ($P/P_0$) upper limit: 0.990 or more

The BET specific surface area was calculated by the BET multipoint method with relative pressures of 0.005, 0.007, 0.010, 0.020, and 0.050.

The maximum value of $P/P_0$ was 0.993 to 0.999.

[Si Position in Composite (C) by Scanning Electron Microscope (SEM) Observation and Energy Dispersive X-Ray Analysis (EDX)]

A carbon double-sided tape was attached to a Si wafer, and the composite (C) was supported on the carbon tape. The cross-section of the powder of the composite (C) supported on the end face of the carbon tape was polished with CROSS SECTION POLISHER® (manufactured by JEOL Ltd.). The polished surface of the composite (C) was observed with a scanning electron microscope (SEM) (Regulus® 8220; manufactured by Hitachi High-Tech Corporation) at a magnification of 500 to 1,000 times. Energy dispersive X-ray analysis (EDX) was performed at the magnification (SEM-EDX analysis).

[Measurement of Particle Size Distribution]

One ultra-small spatula of the composite (C) obtained in each of Examples and Comparative Examples and two drops of a 100-fold diluted solution of an undiluted solution (32% by mass) of a nonionic surfactant (SARAYA coconut detergent high power) were added to 15 mL of water, followed by ultrasonic dispersion for 3 minutes. This dispersion was charged into a laser diffraction-type particle size distribution analyzer (LMS-2000e) manufactured by Seishin Enterprise Co., Ltd., and a volume-based cumulative particle size distribution was measured to determine 10% particle size $D_{V10}$ and 50% particle size $D_{V50}$.

[Measurement of Average Aspect Ratio, Confirmation of Presence or Absence of Conductive Particles]

The porous carbon (A) as a raw material or the composite (C) obtained in Examples and Comparative Examples was supported on a conductive paste or on a carbon tape, and the powder shape was observed under the following conditions.

Scanning electron microscope apparatus: Regulus® 8200 (manufactured by Hitachi High-Tech Corporation)

Acceleration voltage: 1 to 10 kV

Magnification was 1000 to 30000 times.

With respect to one particle randomly selected from SEM photograph, the shape of the particle was approximated to an ellipse having the highest correlation coefficient by using image analysis software ImageJ (developed at US National Institutes of Health). The aspect ratio (major axis/minor axis) was calculated from the ratio of the major axis to the minor axis of this ellipse. Such an analysis was performed on 100 particles selected in the same manner, and the average aspect ratio obtained was taken as the average aspect ratio.

The SEM image of the composite free from the conductive particles was compared with the SEM image of the composite containing the conductive particles, and the presence or absence of the conductive particles was determined based on the presence or absence of a protrusion structure on the surface, which is not seen in the former.

[$I_{Si}/I_G$, R Value ($I_D/I_G$)]

The composite (C) obtained in Examples and Comparative Examples was measured an excitation wavelength of 532.36 nm using NRS-5100 of JASCO Corporation as a micro-laser Raman spectrometer.

The ratio of the peak intensity ($I_{Si}$) at 460 to 495 cm$^{-1}$ and the peak intensity ($I_G$) in the vicinity of 1580 cm$^{-1}$ in the Raman spectrum was defined as ($I_{Si}/I_G$).

Measurement was performed at 30 points at random, and the average value of the obtained values was taken as $I_{Si}/I_G$.

The ratio of the peak intensity ($I_D$) in the vicinity of 1350 cm$^{-1}$ and the peak intensity ($I_G$) in the vicinity of 1580 cm$^{-1}$ in a Raman spectrum was defined as (R value ($I_D/I_G$)).

Measurement was performed at 30 points at random, and the average value of the obtained values was taken as R value ($I_D/I_G$).

[XRD Measurement]

The sample was filled in a glass sample plate (window length×width: 18 mm×20 mm, depth: 0.2 mm), and measurement was performed under the following conditions.

XRD apparatus: SmartLab® manufactured by Rigaku Corporation
X-ray source: Cu—Kα ray
Kβ ray removal method: Ni filter
X-ray output: 45 kV, 200 mA
Measuring range: 10.0 to 80.0°
Scan speed: 10.0°/min The obtained XRD pattern was subjected to background removal and smoothing using analysis software (PDXL2, manufactured by Rigaku Corporation), and then subjected to peak fitting to determine the peak position and intensity. In addition, from the obtained XRD pattern, the full width at half maximum of the peak of the 111 plane of Si, (peak intensity of 111 plane of SiC)/(peak intensity of 111 plane of Si) were determined.

[Measurement of Si Content]

The Si content of the composite (C) obtained in Examples and Comparative Examples was measured under the following conditions.

X-ray fluorescence apparatus: NEX CG manufactured by Rigaku Corporation
Tube voltage: 50 kV
Tube current: 1.00 mA
Sample cup: Φ32, 12 mL, CH1530
Sample weight: 3 g
Sample height: 11 mm The composite (C) obtained in Examples and Comparative Examples was introduced into a sample cup, and the Si content was calculated in units of % by mass using the FP method.

[Polymer Content]

The polymer content of the composite (C) obtained in Examples and Comparative Examples was measured under the following conditions.

Apparatus for TG-DTA: (TG-DTA2000SE manufactured by NETZSCH Japan K. K.)
Sample weight: 10 to 20 mg
Sample pan: Alumina pan
Reference: Alumina pan
Gas atmosphere: Ar
Gas flow rate: 100 ml/min
Temperature increasing rate: 10° C./min
Measurement temperature range: Room temperature to 1000° C.

Weight loss occurs due to decomposition of the polymer at around 300° C. In a case where the mass of the composite (C) before heating is A g and the mass of the composite (C) after heating is B g, (A−B) is the content of the polymer. The content of the polymer can be calculated as {(A−B)/A}× 100.

[Preparation of Negative Electrode Sheet]

Styrene-butadiene rubber (SBR) and carboxymethyl cellulose (CMC) were used as binders.

Specifically, 40% by mass aqueous dispersion of SBR and 2% by mass aqueous solution of CMC were used.

A mixture of carbon black (SUPER C45, manufactured by Imerys Graphite & Carbon) and vapor grown carbon fibers (VGCF®-H, manufactured by Showa Denko K. K.) at a mass ratio of 3:2 was prepared as a mixed conductive auxiliary agent.

A slurry for forming a negative electrode layer was obtained by mixing 90 parts by mass of a negative electrode material produced in Examples and Comparative Examples described later, 5 parts by mass of a mixed conductive auxiliary agent, and 2.5 parts by mass of CMC solid with the CMC aqueous solution and 2.5 parts by mass of SBR solid in the form of SBR aqueous dispersion, adding an appropriate amount of water for viscosity adjustment, and kneading the mixture with a rotation/revolution mixer (manufactured by THINKY CORPORATION).

The slurry for forming a negative electrode layer was uniformly applied to a copper foil having a thickness of 20 μm using a doctor blade so as to have a thickness of 150 μm, dried on a hot plate, and then vacuum-dried to obtain a negative electrode sheet. The dried negative electrode sheet was pressed with a uniaxial press at a pressure of 300 MPa to obtain a negative electrode sheet for battery evaluation. The thickness of the obtained negative electrode sheet was 62 μm including the thickness of the copper foil.

[Measurement of Electrode Density]

The negative electrode sheet (current collector+negative electrode layer) after pressing was punched into a circular shape having a diameter of 16 mm, and its mass and thickness were measured. The mass and thickness of the negative electrode layer were determined by subtracting from these values the mass and thickness of the current collector (circular shape with diameter of 16 mm) that had been measured separately, and the weight per area and electrode density (negative electrode layer density) were calculated from the mass and thickness of the negative electrode layer and the diameter (16 mm). The electrode density is not particularly limited, but is preferably 0.7 g/cm$^3$ or more, and preferably 1.8 g/cm$^3$ or less.

In a cell case (inner diameter: about 18 mm) with a screwed-type lid made of polypropylene, the separator (microporous film made of polypropylene) was interposed between the above negative electrode and a metal lithium foil punched out into a size of 16 mmΦ, and an electrolytic solution was added into the cell case to obtain a cell for testing (lithium counter electrode cell). Here, in the lithium counter electrode cell, the negative electrode is referred to as a sample electrode, and the lithium electrode is referred to as a counter electrode.

The electrolytic solution in the lithium counter electrode cell is obtained by mixing 1% by mass of vinylene carbonate (VC) and 10% by mass of fluoroethylene carbonate (FEC) in a solvent in which ethylene carbonate, ethyl methyl carbonate, and diethyl carbonate are mixed at a volume ratio of 3:5:2, and the electrolyte LiPF$_6$ is further dissolved therein to a concentration of 1 mol/L.

In Examples and Comparative Examples, an increase in cell voltage (increase in potential difference) is referred to as charge, and a decrease in cell voltage (decrease in potential difference) is referred to as discharge. In the case of a lithium counter electrode cell using a metal lithium foil as a counter electrode, the metal lithium has a lower oxidation-reduction potential than the working electrode. Therefore, when Li is inserted into the working electrode, the voltage decreases (the potential difference decreases), and thus is discharged. On the contrary, when Li is deinserted from the working electrode, the voltage increases (the potential difference increases), thus is charged. In an actual lithium-ion secondary battery, since a material having a higher oxidation-reduction potential than that of the working electrode (for example, lithium cobalt oxide or lithium nickel manganese cobalt oxide) is opposed to the counter electrode, the working electrode serves as a negative electrode.

[Measurement Test of Initial Li Deinsertion Specific Capacity]

The test was conducted using a lithium counter electrode cell. A constant current (constant current: CC) discharging was performed from OCV to 0.005 V at a current value corresponding to 0.1 C. At the time point when 0.005 V was reached, the discharging was switched to constant voltage (constant voltage: CV) discharging. The cutoff condition was defined as the time point when the current value was decreased to the value corresponding to 0.005 C. The specific capacity at this time is defined as the initial Li insertion specific capacity. Next, constant current charging was performed at a current value corresponding to 0.1 C with an upper limit voltage of 1.5 V. The specific capacity at this time is defined as the initial Li deinsertion specific capacity.

The test was conducted in a constant temperature bath set at 25° C. At this time, the specific capacity is a value obtained by dividing the capacity by the mass of the negative electrode material. In the present test, "the current value equivalent to 1 C" is a current that can discharge the capacity of the sample electrode estimated from the masses of Si and graphite in the negative electrode material contained in the sample electrode and the theoretical specific capacity (4200 mAh/g and 372 mAh/g, respectively) in 1 hour.

Preparation methods, sources, and physical property values of the raw materials for the negative electrode material (porous carbon (A) and composite (C)) are shown below.

[Porous Carbon (A)]

Carbon molecular sieves 1 to 5 having $D_{v50}$ of about 100 to 200 μm were used as the porous carbon (A) in Examples 1 and 2 and Comparative Example 1 to 3. Further, in Examples 3 to 8 and Comparative Example 4, commercially available phenolic resins carbonized and activated were used as the porous carbon (A).

The physical property values are summarized in Table 1. The carbon molecular sieves 1 to 5 were pulverized so as not to hinder the production of the negative electrode sheet, and the particle size was adjusted so as to have a $D_{v50}$ of about 10 μm.

[Composite (C)]

In each of Examples and Comparative Examples, the porous carbon (A) was treated for 1 to 8 hours at a set temperature of 400° C., a pressure of 760 torr and a flow rate of 100 sccm in a tubular furnace having a silane gas flow of 1.3% by volume mixed with nitrogen gas to precipitate Si inside the porous carbon so as to obtain the composite (C).

[Negative Electrode Material]

The obtained composite (C) was used as a negative electrode material for battery evaluation.

Example 1

The carbon molecular sieve 1 (manufactured by Merck, Carbosieve®-G pulverized product) was used as the porous carbon (A). The physical properties of the carbon molecular sieve 1 were as follows: $V_0$=0.450 cm³/g, $V_1$=0.419 cm³/g, $V_2$=0.032 cm³/g, $V_3$=0.320 cm³/g, $V_1/V_0$=0.93, $V_2/V_0$=0.07, and $V_3/V_0$=0.71. The BET specific surface area was 950 m²/g. Si was precipitated in the pores by Si-CVD using silane gas.

The Si content in the obtained composite (C) was 21% by mass.

This composite (C) was used alone as a negative electrode material.

According to the test using a lithium counter electrode cell, the initial Li deinsertion specific capacity of this negative electrode material was 1033 mAh/g.

Example 2

The carbon molecular sieve 2 (manufactured by Merck, Carboxen®-1012 pulverized product) was used as the porous carbon (A). The physical properties of the carbon molecular sieve 2 were as follows: $V_0$=0.820 cm³/g, $V_1$=0.752 cm³/g, $V_2$=0.021 cm³/g, $V_3$=0.585 cm³/g, $V_1/V_0$=0.92, $V_2/V_0$=0.03, and $V_3/V_0$=0.71. The BET specific surface area was 1830 m²/g. Si was precipitated in the pores by Si-CVD using silane gas.

The Si content in the obtained composite (C) was 20% by mass.

This composite (C) was used alone as a negative electrode material. According to the test using a lithium counter electrode cell, the initial Li deinsertion specific capacity of this negative electrode material was 1001 mAh/g.

Figure 1:
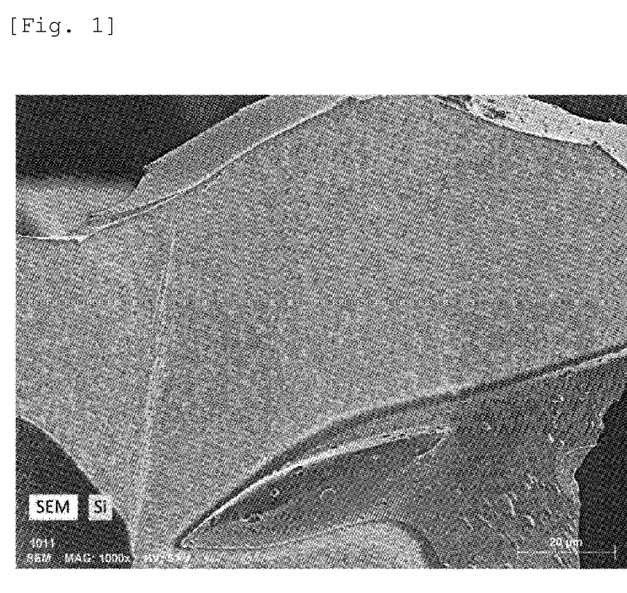
FIG. 1 is a view showing an evaluation result of SEM-EDX of a negative electrode material for a lithium-ion secondary battery of Example 1.
Figure 2:
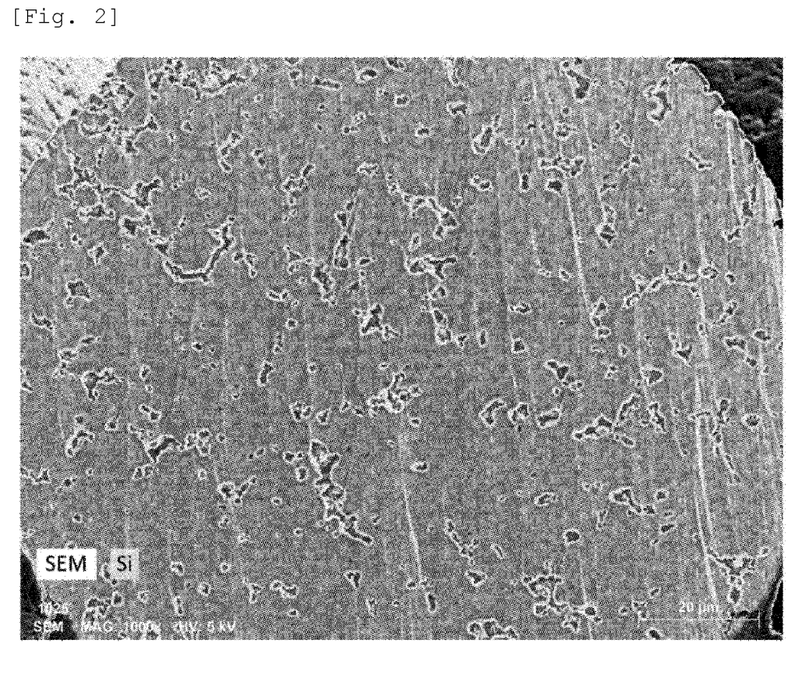
FIG. 2 is a view showing an evaluation result of SEM-EDX of a negative electrode material for a lithium-ion secondary battery of Example 2.

Scanning electron microscope images and EDX images of the composite (C) obtained in Examples 1 and 2 are shown in FIGS. 1 and 2, respectively. As can be seen from the fact that the cross-sections of the particles in FIGS. 1 and 2 have no color contrast and are monotonous, it is indicated that Si is uniformly precipitated throughout the inside of the composite (C) and the capacity per particle of the composite (C) is high.

Example 3

Figure 5:
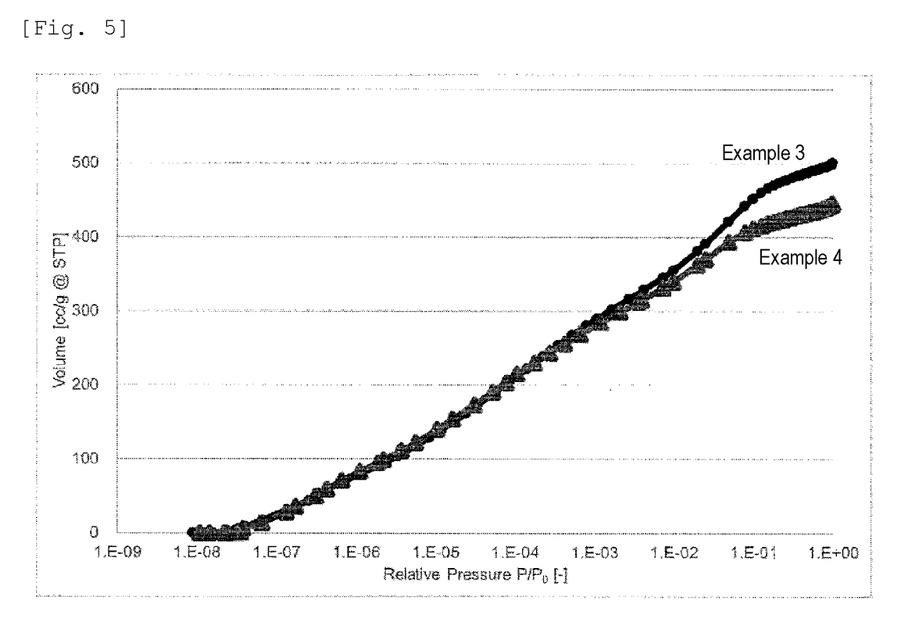
FIG. 5 is a graph showing adsorption isotherms of porous carbon (A) of Examples 3 and 4.

A commercially available spherical phenolic resin ($D_{V50}$=7.0 μm) serving as the porous carbon (A) was calcined at 900° C., carbonized, and then subjected to activation treatment with $CO_2$ at 1000° C. for 1 hour to obtain a spherical active carbon having $V_0$ of 0.780 cm³/g, $V_1$ of 0.703 cm³/g, $V_2$ of 0.067 cm³/g, $V_3$ of 0.594 cm³/g, $V_1/V_0$ of 0.90, $V_2/V_0$ of 0.09, $V_3/V_0$ of 0.76, and a BET specific surface area of 1810 m²/g. FIG. 5 shows adsorption isotherm of the porous carbon (A) obtained in Example 3.

The spherical active carbon was exposed to a silane gas flow in the same manner as in Example 1 to obtain Si-containing composite (C). Si was precipitated in the pores by Si-CVD using silane gas.

The Si content in the obtained composite (C) was 45% by mass.

This composite (C) was used alone as a negative electrode material. According to the test using a lithium counter electrode cell, the initial Li deinsertion specific capacity of this negative electrode material was 1603 mAh/g.

Example 4

A commercially available spherical phenolic resin ($D_{V50}$=7.0 μm) was calcined at 900° C., carbonized, and then subjected to activation treatment with $CO_2$ at 900° C. for 6 hours to obtain a spherical active carbon having $V_0$ of 0.710 cm³/g, $V_1$ of 0.658 cm³/g, $V_2$ of 0.056 cm³/g, $V_3$ of 0.540 cm³/g, $V_1/V_0$ of 0.93, $V_2/V_0$ of 0.08, $V_0/V_0$ of 0.76, and a BET specific surface area of 1700 m²/g. FIG. 5 shows adsorption isotherm of the porous carbon (A) obtained in Example 4.

The spherical active carbon was exposed to a silane gas flow in the same manner as in Example 1 to obtain the composite (C). Si was precipitated in the pores by Si-CVD using silane gas.

The Si content in the obtained composite (C) was 42% by mass.

This composite (C) was used alone as a negative electrode material. According to the test using a lithium counter electrode cell, the initial Li deinsertion specific capacity of this negative electrode material was 1521 mAh/g.

Example 5

A commercially available spherical phenolic resin ($D_{v50}$=19.0 μm) was calcined at 900° C., carbonized, and then subjected to activation treatment with $CO_2$ at 950° C. for 3.5 hours to obtain a spherical active carbon having $V_0$ of 0.777 cm³/g, $V_1$ of 0.690 cm³/g, $V_2$ of 0.053 cm³/g, $V_3$ of 0.573 cm³/g, $V_1/V_0$ of 0.89, $V_2/V_0$ of 0.07, $V_3/V_0$ of 0.74, and a BET specific surface area of 1790 m²/g. The spherical active carbon was exposed to a silane gas flow in the same manner as in Example 1 to obtain the composite (C). Si was precipitated in the pores by Si-CVD using silane gas.

The Si content in the obtained composite (C) was 44% by mass.

This composite (C) was used alone as a negative electrode material. According to the test using a lithium counter electrode cell, the initial Li deinsertion specific capacity of this negative electrode material was 1502 mAh/g.

Example 6

Into 800 g of water, 156 g of flake graphite (KS-6, Timcal), 40 g of acetylene black (HS-100, Denka Company Limited) and 4 g of carboxymethyl cellulose were added, and the mixture was dispersed and mixed in a bead mill to obtain a conductive particle dispersion (solid content 25% by mass).

In a batch vessel for a rotation/revolution mixer (manufactured by THINKY CORPORATION), 0.500 g of water and 1.067 g of a 4.5% by mass aqueous solution of pullulan were weighed, and the mixture was rotated and mixed at 1000 rpm for 2 minutes. Then, 2.668 g of the composite (C) prepared in Example 3 was added, and the mixture was rotated and mixed at 1000 rpm for 2 minutes. Then, 0.6072 g of the conductive particle dispersion was added, and the mixture was rotated and mixed at 1000 rpm for 2 minutes. Then, 0.111 g of a 4.8% by mass aqueous solution of trehalose was added, and the mixture was rotated and mixed at 1000 rpm for 2 minutes to obtain a mixed slurry. A Teflon® sheet was laid on a hot plate kept warm at 110° C., and the mixed slurry was laid in the form of a Teflon® sheet and dried for 5 hours. The solid matter obtained by drying was crushed in a mortar to obtain the composite (C).

The Si content in the obtained composite (C) was 42% by mass. By SEM observation, protruding portions corresponding to the conductive particles were confirmed on the surface of the composite (C). Further, the polymer content was confirmed to be about 2% by mass by TG-DTA measurement.

This composite (C) was used alone as a negative electrode material. According to the test using a lithium counter electrode cell, the initial Li deinsertion specific capacity of this negative electrode material was 1702 mAh/g. Although the Si content was lower than in Example 3, the initial Li deinsertion specific capacity was increased. The present inventors consider that this is because the electronic conductivity is improved due to the conductive particles derived from the conductive particle dispersion present in the outer periphery of the composite (C).

Example 7

The composite (C) was obtained in the same manner as in Example 6 except that pullulan was replaced with tamarind seed gum, and trehalose with sorbitol.

The Si content in the obtained composite (C) was 42% by mass. By SEM observation, protruding portions corresponding to the conductive particles were confirmed on the surface of the composite (C). Further, the polymer content was confirmed to be about 2% by mass by TG-DTA measurement.

This composite (C) was used alone as a negative electrode material. According to the test using a lithium counter electrode cell, the initial Li deinsertion specific capacity of this negative electrode material was 1689 mAh/g. Although the Si content was lower than in Example 3, the initial Li deinsertion specific capacity was increased. The present inventors consider that this is because the electronic conductivity is improved due to the conductive particles derived from the conductive particle dispersion present in the outer periphery of the composite (C).

Example 8

The composite (C) was obtained in the same manner as in Example 6 except that pullulan was replaced with pectin, and trehalose with sorbitol.

The Si content in the obtained composite (C) was 42% by mass. By SEM observation, protruding portions corresponding to the conductive particles were confirmed on the surface of the composite (C). Further, the polymer content was confirmed to be about 2% by mass by TG-DTA measurement.

This composite (C) was used alone as a negative electrode material. According to the test using a lithium counter electrode cell, the initial Li deinsertion specific capacity of this negative electrode material was 1695 mAh/g. Although the Si content was lower than in Example 3, the initial Li deinsertion specific capacity was increased. The present inventors consider that this is because the electronic conductivity is improved due to the conductive particles derived from the conductive particle dispersion present in the outer periphery of the composite (C).

Comparative Example 1

The carbon molecular sieve 3 (manufactured by Merck, Carbosieve® S-III pulverized product) was used as the porous carbon (A). The physical properties of the carbon molecular sieve 3 were as follows: $V_0$=0.390 cm³/g, $V_1$=0.380 cm³/g, $V_2$=0.054 cm³/g, $V_3$=0.350 cm³/g, $V_1/V_0$=0.97, $V_2/V_0$=0.14, and $V_3/V_0$=0.90. The BET specific surface area was 830 m²/g. Si was precipitated in the pores by Si-CVD using silane gas.

The Si content in the obtained composite (C) was 9% by mass.

This composite (C) was used alone as a negative electrode material. According to the test using a lithium counter electrode cell, the initial Li deinsertion specific capacity of this negative electrode material was 632 mAh/g, which was lower than that of Examples.

Comparative Example 2

The carbon molecular sieve 4 (manufactured by Merck, Carboxen®-1021 pulverized product) was used as the porous carbon (A). The physical properties of the carbon molecular sieve 4 were as follows: $V_0$=0.340 cm$^3$/g, $V_1$=0.061 cm$^3$/g, $V_2$=0.000 cm$^3$/g, $V_3$=0.030 cm$^3$/g, $V_1/V_0$=0.18, $V_2/V_0$=0.00, $V_3/V_0$=0.09, and BET specific surface area was 280 m$^2$/g. Si was precipitated in the pores by Si-CVD using silane gas.

The Si content in the obtained composite (C) was 4% by mass.

This composite (C) was used alone as a negative electrode material. According to the test using a lithium counter electrode cell, the initial Li deinsertion specific capacity of this negative electrode material was 462 mAh/g, which was lower than that of Examples.

Figure 3:
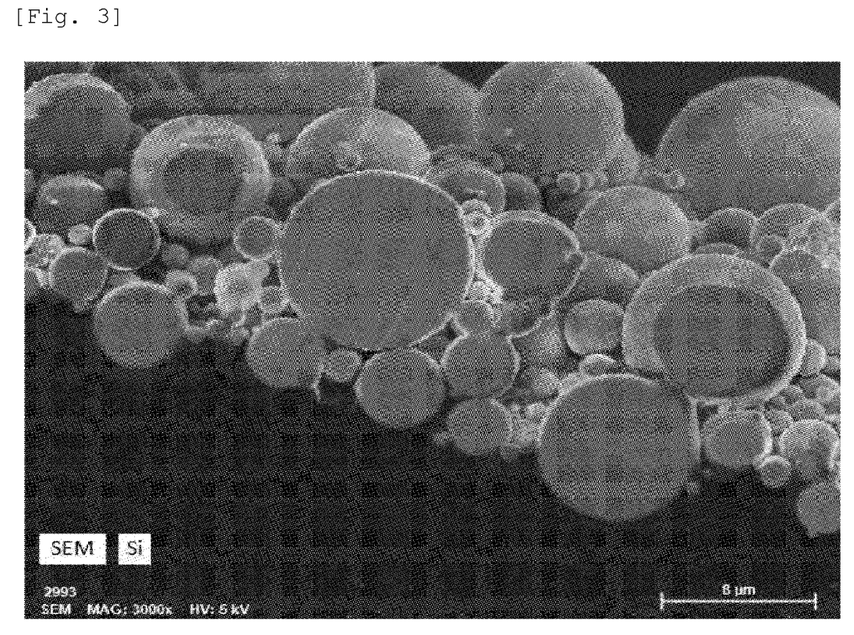
FIG. 3 is a view showing an evaluation result of SEM-EDX of a negative electrode material for a lithium-ion secondary battery of Comparative Example 1.
Figure 4:
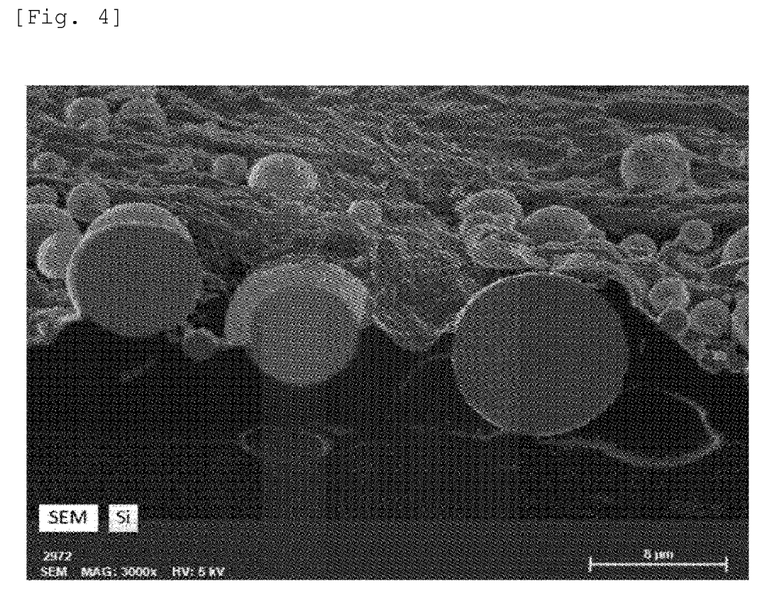
FIG. 4 is a view showing an evaluation result of SEM-EDX of a negative electrode material for a lithium-ion secondary battery of Comparative Example 2.

Scanning electron microscope images and EDX images of the composite (C) obtained in Comparative Examples 1 and 2 are shown in FIGS. 3 and 4, respectively. As can be seen from FIGS. 3 and 4, Si is precipitated on the surface or in the vicinity of the surface, indicating that the capacity per particle of the composite (C) does not increase.

Comparative Example 3

The carbon molecular sieve 5 (manufactured by Merck, Carboxen®-1000 pulverized product) was used as the porous carbon (A). The physical properties of the carbon molecular sieve 5 were as follows: $V_0$=0.990 cm$^3$/g, $V_1$=0.576 cm$^3$/g, $V_2$=0.090 cm$^3$/g, $V_3$=0.532 cm$^3$/g, $V_1/V_0$=0.58, $V_2/V_0$=0.09, $V_3/V_0$=0.54, and BET specific surface area was 1200 m$^2$/g. Si was precipitated in the pores by Si-CVD using silane gas.

The Si content in the obtained composite (C) was 59% by mass.

This composite (C) was used alone as a negative electrode material. According to the test using a lithium counter electrode cell, the initial Li deinsertion specific capacity of this negative electrode material was 711 mAh/g, which was lower than the capacity assumed from the amount of Si contained and that of Examples. The present inventors presume that this is because the decrease in $V_1/V_0$ leads to the occurrence of Si lumps and the increase in Si that makes Li$^+$ difficult to diffuse, that is, Si that hardly contribute to the reaction increases.

Comparative Example 4

A commercially available spherical phenolic resin ($D_{v50}$=7.0 μm) serving as the porous carbon (A) was calcined at 900° C. and carbonized to obtain a spherical active carbon having $V_0$ of 0.275 cm$^3$/g, $V_1$ of 0.117 cm$^3$/g, $V_2$ of 0.000 cm$^3$/g, $V_3$ of 0.214 cm$^3$/g, $V_1/V_0$ of 0.83, $V_2/V_0$ of 0.00, $V_3/V_0$ of 0.78, and a BET specific surface area of 598 m$^2$/g.

The spherical active carbon was subjected to Si-CVD using silane gas in the same manner as in Example 1 to precipitate Si in the pores.

The Si content in the obtained composite (C) was 4% by mass.

This composite (C) was used alone as a negative electrode material. According to the test using a lithium counter electrode cell, the initial Li deinsertion specific capacity of this negative electrode material was 312 mAh/g, which was lower than that of Examples.

The results obtained are summarized in Table 1.

TABLE 1

| | Porous carbon (A) | | | | | | | |
|---|---|---|---|---|---|---|---|---|
| | Total pore volume $V_0$ [cm$^3$/g] | Cumulative pore volume $V_1$ [cm$^3$/g] | Cumulative pore volume $V_2$ [cm$^3$/g] | Cumulative pore volume $V_3$ [cm$^3$/g] | $V_1/V_0$ | $V_2/V_0$ | $V_3/V_0$ | BET-SSA [m$^2$/g] |
| Ex. 1 | 0.450 | 0.419 | 0.032 | 0.320 | 0.93 | 0.07 | 0.71 | 950 |
| Ex. 2 | 0.820 | 0.752 | 0.021 | 0.585 | 0.92 | 0.03 | 0.71 | 1830 |
| Ex. 3 | 0.780 | 0.703 | 0.067 | 0.594 | 0.90 | 0.09 | 0.76 | 1810 |
| Ex. 4 | 0.710 | 0.658 | 0.056 | 0.540 | 0.93 | 0.08 | 0.76 | 1700 |
| Ex. 5 | 0.777 | 0.690 | 0.053 | 0.573 | 0.89 | 0.07 | 0.74 | 1790 |
| Ex. 6 | 0.780 | 0.703 | 0.067 | 0.594 | 0.90 | 0.09 | 0.76 | 1810 |
| Ex. 7 | 0.780 | 0.703 | 0.067 | 0.594 | 0.90 | 0.09 | 0.76 | 1810 |
| Ex. 8 | 0.780 | 0.703 | 0.067 | 0.594 | 0.90 | 0.09 | 0.76 | 1810 |
| Comp. Ex. 1 | 0.390 | 0.380 | 0.054 | 0.350 | 0.97 | 0.14 | 0.90 | 830 |
| Comp. Ex. 2 | 0.340 | 0.061 | 0.000 | 0.030 | 0.18 | 0.00 | 0.09 | 280 |
| Comp. Ex. 3 | 0.990 | 0.576 | 0.090 | 0.532 | 0.58 | 0.09 | 0.54 | 1200 |
| Comp. Ex. 4 | 0.275 | 0.117 | 0.000 | 0.214 | 0.83 | 0.00 | 0.78 | 598 |

| | Composite (C) | | | | | | | | |
|---|---|---|---|---|---|---|---|---|---|
| | $D_{V10}$ [μm] | $D_{V50}$ [μm] | BET-SSA [m$^2$/g] | Average aspect ratio | Theoretical Si content [% by mass] | Si content [% by mass] | Full width at half maximum of peak of 111 plane of Si [°] | Raman spectroscopy ($I_{Si}/I_G$) | Raman spectroscopy R value ($I_D/I_G$) | Electrochemical characteristics Initial Li deinsertion specific capacity [mAh/g] |
| Ex. 1 | 3.2 | 8.6 | 3.1 | 2.22 | 51.1 | 21 | 4.31 | 0.17 | 0.99 | 1033 |
| Ex. 2 | 3.3 | 9.1 | 2.7 | 1.21 | 65.5 | 20 | 4.28 | 0.07 | 1.04 | 1001 |
| Ex. 3 | 3.1 | 6.6 | 1.6 | 1.01 | 64.3 | 45 | 4.34 | 0.11 | 1.05 | 1603 |

TABLE 1-continued

| | | | | | | | | | |
|---|---|---|---|---|---|---|---|---|---|
| Ex. 4 | 2.9 | 6.3 | 1.2 | 1.19 | 62.2 | 42 | 4.32 | 0.12 | 1.04 | 1521 |
| Ex. 5 | 10.8 | 19.3 | 0.4 | 1.12 | 64.3 | 44 | 4.32 | 0.21 | 1.09 | 1502 |
| Ex. 6 | 4.2 | 11.3 | 4.7 | 1.02 | 64.3 | 42 | 4.41 | 0.07 | 1.01 | 1702 |
| Ex. 7 | 4.4 | 11.8 | 4.4 | 1.03 | 64.3 | 42 | 4.43 | 0.06 | 1.02 | 1689 |
| Ex. 8 | 4.8 | 13.2 | 4.3 | 1.03 | 64.3 | 42 | 4.42 | 0.08 | 1.01 | 1695 |
| Comp. Ex. 1 | 2.5 | 8.2 | 3.4 | 1.11 | 47.5 | 9 | 4.43 | 0.06 | 1.12 | 632 |
| Comp. Ex. 2 | 2.4 | 7.3 | 2.2 | 1.02 | 44.1 | 4 | 4.32 | 0.09 | 1.03 | 462 |
| Comp. Ex. 3 | 3.1 | 8.2 | 3.0 | 1.12 | 69.7 | 59 | 4.22 | 0.21 | 1.03 | 711 |
| Comp. Ex. 4 | 5.3 | 10.6 | 0.8 | 1.12 | 38.9 | 4 | 4.33 | 0.51 | 0.95 | 312 |

The invention claimed is:

1. A negative electrode material for a lithium-ion secondary battery comprising a composite (C), the composite (C) comprising a porous carbon (A) and a Si-containing compound (B), wherein the porous carbon (A) and the Si-containing compound (B) are as follows:
wherein the porous carbon (A) satisfies $V_1/V_0 > 0.80$, $V_2/V_0 < 0.10$, and $V_3/V_0 > 0.50$,
when a total pore volume at a maximum value of a relative pressure $P/P_0$ is defined as $V_0$ and $P_0$ is a saturated vapor pressure,
a cumulative pore volume at a relative pressure $P/P_0 = 0.1$ is defined as $V_1$, and
a cumulative pore volume at a relative pressure $P/P_0 = 10^{-7}$ is defined as $V_2$,
a cumulative pore volume at a relative pressure $P/P_0 = 10^{-2}$ is defined as $V_3$ in the nitrogen adsorption test, and has a BET specific surface area of 800 m$^2$/g or more; and
wherein the Si-containing compound (B) is contained in pores of the porous carbon (A).

2. The negative electrode material for a lithium-ion secondary battery according to claim 1, wherein the porous carbon (A) has the total pore volume $V_0$ in the nitrogen adsorption test of 0.4 cm$^3$/g or more and less than 1.0 cm$^3$/g.

3. The negative electrode material for a lithium-ion secondary battery according to claim 1, wherein the composite (C) has a 50% particle size ($D_{V50}$) of 2.0 μm or more and 30.0 μm or less, has a 10% particle size ($D_{V10}$) of 1.0 μm or more in a volume-based cumulative particle size distribution by laser diffraction method, and has a BET specific surface area of 0.5 m$^2$/g or more and 40.0 m$^2$/g or less.

4. The negative electrode material for a lithium-ion secondary battery according to claim 1, wherein the composite (C) has an average aspect ratio of 1.00 or more and 2.50 or less.

5. The negative electrode material for a lithium-ion secondary battery according to claim 1, wherein the Si-containing compound (B) is one or more selected from silicon elemental substance, silicon oxide, and silicon carbide.

6. The negative electrode material for a lithium-ion secondary battery according to claim 1, wherein a Si content in the composite (C) is 15% by mass or more and 85% by mass or less.

7. The negative electrode material for a lithium-ion secondary battery according to claim 1, wherein the Si content in the composite (C) is 15% or more and 95% or less with respect to a theoretical value, when a true density of Si is set to 2.32 g/cm$^3$ with respect to the total pore volume $V_0$ of the porous carbon (A), the theoretical value of the Si content (theoretical Si content) when total pores of the porous carbon (A) are occupied by Si is determined from:

theoretical Si content(%)=($V_0$ [cm$^3$/g]×1 [g]×2.32 [g/cm$^3$])/(($V_0$ [cm$^3$/g]×1 [g]×2.32 [g/cm$^3$])+1 [g])×100.

8. The negative electrode material for a lithium-ion secondary battery according to claim 1, wherein ($I_{Si}/I_G$) is less than 0.30 with respect to a peak intensity ($I_{Si}$) in the vicinity of 470 cm$^{-1}$ and a peak intensity ($I_G$) in the vicinity of 1580 cm$^{-1}$ measured by Raman spectroscopy of the composite (C).

9. The negative electrode material for a lithium-ion secondary battery according to claim 1, wherein ($I_D/I_G$) is 0.50 or more and less than 1.50 with respect to a peak intensity ($I_G$) in the vicinity of 1580 cm$^{-1}$ and a peak intensity ($I_D$) in the vicinity of 1350 cm$^{-1}$ measured by Raman spectroscopy of the composite (C).

10. The negative electrode material for a lithium-ion secondary battery according to claim 1, wherein in an XRD pattern using a Cu—Kα ray of the composite (C), a full width at half maximum of a peak of a 111 plane of Si is 3.00° or more.

11. The negative electrode material for a lithium-ion secondary battery according to claim 1, further comprising inorganic particles and a polymer on a portion or the entire surface of the composite (C), wherein the inorganic particles comprise one or more selected from graphite and carbon black, and a content of the polymer is 0.1 to 10.0% by mass.

12. A negative electrode sheet comprising a sheet-like current collector and a negative electrode layer covering the current collector, the negative electrode layer comprising a binder and the negative electrode material for a lithium-ion secondary battery according to claim 1.

13. A lithium-ion secondary battery having a negative electrode comprising the negative electrode sheet according to claim 12.

* * * * *